United States Patent
Asano et al.

(10) Patent No.: US 6,913,723 B2
(45) Date of Patent: Jul. 5, 2005

(54) PROCESS OF MAKING A GUIDE ROLLER FOR A MAGNETIC TAPE CASSETTE

(75) Inventors: Katsuki Asano, Kanagawa (JP); Masayoshi Moriwaki, Kanagawa (JP); Shigeru Nishiyama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 345 days.

(21) Appl. No.: 10/246,404

(22) Filed: Sep. 19, 2002

(65) Prior Publication Data

US 2003/0034414 A1 Feb. 20, 2003

Related U.S. Application Data

(62) Division of application No. 09/729,857, filed on Dec. 6, 2000, now Pat. No. 6,595,450.

(30) Foreign Application Priority Data

Dec. 6, 1999 (JP) .......................... P. 11-346518
Dec. 22, 1999 (JP) .......................... P. 11-364692
Dec. 24, 1999 (JP) .......................... P. 11-367946
Sep. 27, 2000 (JP) ...................... P. 2000-294540

(51) Int. Cl.[7] .................. B29C 45/16; B29C 45/38

(52) U.S. Cl. .................. 264/161; 264/250; 264/255
(58) Field of Search .............................. 264/138, 161, 264/250, 255

(56) References Cited

U.S. PATENT DOCUMENTS 5,662,850 A * 9/1997 Konno et al. ............ 264/255 X

* cited by examiner

*Primary Examiner*—Leo B. Tentoni
(74) *Attorney, Agent, or Firm*—Sughrue Mion, PLLC

(57) ABSTRACT

A magnetic tape cassette and a guide roller in which the magnetic tape can stably travel and the magnetic head can read/write the record correctly, and a method of manufacturing the guide roller are provided. The magnetic tape cassette of the present invention comprises a guide roller 106 rotatably supported by the lower cassette half. The guide roller is almost in the shape of a barrel of which a coefficient of curvature T expressed by the expression [1] representing the extent of curvature of the circumferential surface is in the range between 0.001 and 0.01, and comprises a primary molding and injected resin injected within the primary molding for bulging said primary molding into the shape of said barrel shaped cavity that has a largest diameter at the parting line by the injection pressure.

4 Claims, 20 Drawing Sheets

PROCESS OF MAKING A GUIDE ROLLER FOR A MAGNETIC TAPE CASSETTE

This is a divisional of Pat. No. 6,595,450 issued Jul. 22, 2003 (application Ser. No. 09/729,857 filed Dec. 6, 2000); the disclosure of which is incorporated herein by reference.

BACKGROUND OF THE INVENTION

The present invention relates to a guide roller for guiding a magnetic tape in the magnetic tape cassette and a method of manufacturing the same.

Conventionally, a magnetic tape cassette is widely used as a storage medium. The magnetic tape cassette is divided into ones for consumer use and ones for industrial use depending on the purpose. FIG. 20 is an exploded perspective view showing main components of a BETACAM L cassette that is a magnetic tape cassette for commercial use.

As shown in FIG. 20, the BETACAM L cassette (hereinafter referred to as "magnetic tape cassette") 20 generally comprises an upper cassette half and a lower cassette half 22 constituting a cassette case, a pair of tape reels which is rotatably received in the upper and lower cassette halves 24, 22 and on which a magnetic tape 26 is wound, and a lid 32 for opening and closing the opening formed on the front end side of the upper and lower cassette halves 24 and 22.

On the lower cassette half 22, guide rollers 36 and metallic guide pins 38 are mounted at both sides of the opening on the front end side across which a magnetic tape 26 is to be routed. In addition, pads 44 to be in sliding contact with the back side of the magnetic tape 26 is mounted on the lower cassette half 22. On the upper cassette half 24, there are provided reel springs 28 for urging the respective tape reels 28, 30 via the reel holders 46, and center caps 50 for engaging the reel springs 48 from outside of said cassette half 24. The upper and lower cassette halves 24, 22 are fixed together by a plurality of screws 34.

Among components described above, the guide roller 36 is a cylindrical member formed of a smooth and mechanically strong resin such as POM, and rotatably supported on the lower cassette half 22 by being loosely fitted on the trunnion pin 36A fixed on the lower cassette half 22.

FIG. 21 is an enlarged view of the guide roller 36 and the guide pin 38 on the lower cassette half 22 viewed in the direction shown by the arrow B in FIG. 20. In FIG. 21, there is shown a state where the magnetic tape 26 is routed from the tape reel 28 (See FIG. 20) over the guide roller 36 and the guide pin 38. The pad 44 is in sliding contact with the back surface of the magnetic tape 26 between the tape reel 28 and the guide roller 36 and urges the magnetic tape 26. As a consequent, the magnetic tape 26 comes into contact with the outer periphery of the guide roller 36. When the magnetic tape cassette 20 is loaded on the recording/replaying apparatus, not shown, and replayed or rewound, the magnetic tape 26 is passed on the outer periphery of the guide roller and then routed out from the cassette case and then travels over the magnetic head of the recording/replaying apparatus.

FIG. 22 is a cross sectional view taken along the line C—C in FIG. 21. The guide roller 36 is cylindrical in shape and the outer periphery thereof has a uniform diameter.

In the guide roller 36 of the magnetic tape cassette 20 as described above, there are cases where the magnetic tape 26 being in contact with the guide roller 36 is displaced from the normal position upwardly along the axis of said guide roller or downwardly along the same though it is not shown, and thus the magnetic tape 26 does not travel stably. As a consequent, when the magnetic tape 26 is traveling over the magnetic head of the recording/replaying apparatus, the position of the magnetic tape 26 may be displaced with respect to the magnetic head, and thus reading or writing of the record cannot be accomplished properly. This is a problem.

On the other hand, when molding a guide roller 36 described above by injection molding, the parting line PL of the mold is normally defined along the end surface of the molded object. However, it has been a very troublesome work to take an elongated guide roller out of the mold. Though it is also possible to form the guide roller 36 by cutting a bar by machining, it requires a long process time. In addition, since a costly machine such as NC lathe is required for such a cutting work, the processing cost increases to a significant level.

In order to solve this problem, the parting line of the injection mold may be defined along the center portion or along the axis thereof. However, defining the parting line in this way generates molding burr that projects all along the periphery thereof, and thus the secondary process such as cutting work must be made by a machine for deburring, which results in increase in time and effort. This is also a problem.

In addition, since the guide roller 36 shown in FIG. 22 guides the magnetic tape 26, it is supported with good rotatability, and thus when the magnetic tape 26 travels at high velocity such as fast forwarding operation or fast rewinding operation, the guide roller 36 rotates at high velocity accordingly. Consequently, at least one of the guide roller 36 and the upper and lower cassette halves 24, 22 is cut down by friction between the upper and lower end surfaces of the guide roller 36 and the inner surfaces of the upper and lower cassette halves 24, 22, and resultant cutting powder may be attached on the magnetic tape 26 and cause a dropout.

It has been shown that when the magnetic tape 26 is running at low velocity for replaying the record, the guide roller also rotates at a low velocity and the upper and lower end surfaces of the guide roller 36 comes into contact with the inner surfaces of the upper and lower cassette halves 24, 22, but cutting powder is not generated during low velocity rotation. This is a problem.

SUMMARY OF THE INVENTION

It is an object of the present invention to solve the above-mentioned problem in the conventional technique.

With such problems in view, the first object of the present invention is to provide a magnetic tape cassette in which the magnetic tape can travel stably so that the magnetic head can accomplish reading and writing of the record on the magnetic tape correctly.

With this problem in view, the second object of the present invention is to provide a guide roller that allows the magnetic tape to travel stably so that reading and writing of the record on the magnetic tape can be accomplished correctly without generating molding burr on the circumferential surface along the parting line, and the method of manufacturing the same.

With the problem described above in view, the third embodiment of the present invention is to provide a guide roller for the magnetic tape cassette in which generation of cutting powder at the contact point between the guide roller and the upper and lower cassette halves is minimized, and the magnetic head can carry out reading and writing of the record on the magnetic tape correctly.

In other words, said first object of the present invention is accomplished by a magnetic tape cassette comprising a pair of tape reels with a magnetic tape wound therearound and a guide roller for transferring said magnetic tape rotatably supported within a cassette case formed by combining the upper cassette half and the lower cassette half so that said magnetic tape is guided by said guide roller and travels at a prescribed position, wherein said guide roller is generally barrel shaped, and a coefficient of curvature T expressed by the expression [1] which represents the extent of curvature of the outer circumferential surface thereof is between 0.001 and 0.01 inclusive.

$$T=\Delta/(L\Phi_{max}) \quad [1]$$

Wherein $\Delta$ represents a difference between the maximum diameter and the minimum diameter of the outer circumferential surface of the guide roller (mm), L represents the axial length of the guide roller, and $\Phi_{max}$ is a maximum diameter (mm) of the circumferential surface of the guide roller (mm).

The present Inventor has found that the problems described above may be solved by employing a barrel shaped guide roller and defining the extent of curvature of the outer circumferential surface within a prescribed range.

In the magnetic tape cassette having a structure as described above, the circumferential velocity of the portion of the outer circumferential surface of the guide roller having a maximum diameter is faster than the circumferential velocity of other portion. The magnetic tape traveling on the outer circumferential surface of the guide roller is guided to the position of said guide roller of which the circumferential velocity is faster. In addition, in the guide roller of this type, since the coefficient of curvature T representative of the extent of curvature of the outer circumferential surface in the range between 0.001 and 0.01 inclusive, the magnetic tape travels stably without being displaced from the correct position during its travel on the outer circumferential surface, and thus error in reading and writing is prevented from occurring when the magnetic tape is traveling over the magnetic head.

Though a guide roller having a curved outer circumferential surface such that the circumferential diameter is maximum at the axially central portion and gradually decreases from the axially central portion toward both ends may be employed, it is not limited thereto. For example, it is also possible to make the circumferential diameter at a prescribed position of the guide roller maximum so that the magnetic tape may be guided at a desired position.

The second object of the present invention is accomplished by the guide roller of the magnetic tape cassette stated below in (1) to (4), and the method of manufacturing the same.

(1) A guide roller of the magnetic tape cassette comprising a tubular primary molding as an outer jacket, and injection resin as content to be bulged within the core and cavity plates formed in a barrel shaped cavity having a maximum diameter at the parting line.

(2) A method of manufacturing a guide roller for the magnetic tape cassette comprising steps of: injecting resin between a sleeve being slidable with respect to an insert pin and a first cavity plate having a cylindrical cavity to mold a tubular primary molding; leaving said primary molding by withdrawing said first cavity plate; moving a mold comprising a core and a cavity plates having two halves of barrel shaped cavities having its maximum diameter at its parting line and a gate defined within said primary molding onto the outer periphery of said primary molding; and withdrawing said sleeve, injecting resin between the inner side of said primary molding and said insert pin through said gate, and bulging said primary molding into said barrel shaped cavity by the injecting pressure to integrate said primary molding with resin injected within said primary molding.

(3) A method of manufacturing a guide roller of a magnetic tape cassette comprising steps of: molding a tubular primary molding by arranging a slidable double sleeves within a barrel shaped cavity half of the core plate, providing a pin for opening/closing the gate facing toward the barrel shaped cavity half of the cavity plate, then opening a gate by the action of said gate opening/closing pin with said double sleeve projected into said cavity when closing said mold formed of both plates and injecting resin between said double sleeves to form a tubular primary molding; leaving said primary molding body within a cavity by closing said gate and withdrawing said double sleeves; opening said gate again, injecting resin within said primary molding through said gate and bulging said primary molding into the shape of said barrel shaped cavity by the injection pressure to integrate said primary molding with resin injected within said primary molding.

(4) A method of manufacturing a guide roller of the magnetic tape cassette wherein a mold comprises a core plate, a cavity plate, and a runner plate being able to be detached from said cavity plate and having a gate at the tip thereof, further comprising steps of: molding a tubular primary molding by injecting resin between said double sleeves through a gate of the runner plate with the slidable double sleeves projected within said cavity when closing the mold of each plate, leaving the primary molding within said cavity, injecting resin again within the primary molding through said gate of said runner plate and bulging said primary molding into the shape of said cavity by the injection pressure to integrate said primary molding with resin injected within said primary molding, and cutting the gate by detaching said runner plate.

In a guide roller of the magnetic tape cassette as set forth in (1) above, since the already molded primary molding comes into contact with the parting line of the cavity at the time of injection molding, there is no possibility that a molding burr is generated along the outer circumferential surface of the guide roller. The guide roller as set forth in (1) above is specifically effective for the guide roller having a barrel shaped outer periphery with the maximum diameter at a prescribed location in the axial direction. In other words, it is effective when the guide roller cannot be forced out utilizing resiliency of resin since the bulged large diameter portion of the barrel shaped guide roller does not become an undercut.

The outer jacket of the guide roller formed of the primary molding is preferably situated behind the end surface of the guide roller that is a molding. It is for preventing the end of the primary molding from interfering with rotation of the guide roller in the state being fitted on the pin with the end surface being seated on the bottom surface of the cassette half.

Since resin resists flowing when the thickness of the primary molding of the guide roller is less then 0.1 mm, and resists bulging into the barrel shape when the thickness exceeds 1.0 mm, it is preferable to set the thickness of the primary molding in the range between 0.1 mm and 1.0 mm inclusive.

According to a method of manufacturing as set forth in (2) above, the guide roller having a first molding as an outer jacket is molded by molding a tubular primary molding outside the sleeve, then withdrawing the sleeve, and injecting resin within the primary molding.

The method of molding as set forth in (3) above is so called hot runner method, wherein a first molding and the body portion are formed in two stages in the identical molding by the movement of the sleeve and the pin for opening/closing the gate at the time of mold closing. Therefore, replacement of the cavity mold is not necessary.

The method of molding as set forth in (4) above is so called cold runner method, wherein the primary molding and the body portion are formed in two stages in the identical mold by the combination of the movement of the sleeve and the presence of absence of the supply of resin from the runner plate at the time of mold closing. Therefore replacement of the cavity mold is not necessary.

The third embodiment of the present invention is accomplished by the structure shown below.

(5) A guide roller for a magnetic tape rotatably supported in the vicinity of the opening formed on the magnetic tape cassette for exposing the magnetic tape for guiding the forwarding and rewinding operation of the magnetic tape, wherein said guide roller has a shape that can take air around the outer periphery when said magnetic tape is traveling at high velocity.

(6) A guide roller for a magnetic tape cassette as set forth in (5) above, wherein the axially central potion of the circumferential surface of said guide roller is a flat surface.

(7) A guide roller for a magnetic tape as set forth in (5) above, wherein the radius of curvature of the circumferential surface thereof is larger at the axially central portion than the axially end portions.

(8) A guide roller for a magnetic tape as set forth in (7) above, wherein the distance between the circumferential surface of said axially central portion and the extended circular arc surface at said axially ends portion is not less than 0.05 mm.

(9) A guide roller for a magnetic tape cassette as set forth in any one of (5) to (8), wherein said guide roller is provided with a recess at the axially central portion of the circumferential surface thereof.

(10) A guide roller for a magnetic tape cassette as set forth in (9) above, a plurality of said recesses are formed circumferentially at adequate intervals with respect to each other.

(11) A guide roller for a magnetic tape cassette as set forth in (9) or (10) above wherein the depth of said recess at the axially ends from the extended circular arc surface is between 0.05 mm and 0.3 mm inclusive.

In the guide roller for a magnetic tape cassette having a structure described above, since air is taken in around the circumferential surface of the guide roller when the magnetic tape is traveling at high velocity, adhesion between the magnetic tape and the guide roller is lowered, thereby reducing the followability of the guide roller to the magnetic tape traveling at high velocity. Therefore, the guide roller slips with respect to the magnetic tape traveling at high velocity all the time or intermittently. Therefore, even when the magnetic tape travels at high velocity, cutting powder can be prevented from being generated from at least one of the guide roller and the upper and lower cassette halves.

In order to construct in such a manner that air is taken-in around the circumferential surface of the guide roller when the magnetic tape is traveling at high velocity, for example, the axially central portion of the circumferential surface of the guide roller may be formed in a plane surface as in (6), the radius of curvature of the circumferential surface of the guide roller may be defined to be lager at the axially central portion than the axially ends portion as in (7), or a recess may be provided at the axially central portion of the circumferential surface of the guide roller as in (8). Though the recesses stated in (8) are preferably provided all around the circumferential region, it is also possible to provide them along a part of the circumference at adequate intervals.

DETAILED DESCRIPTION OF THE PREFERRED EMBODIMENTS

Figure 1B:
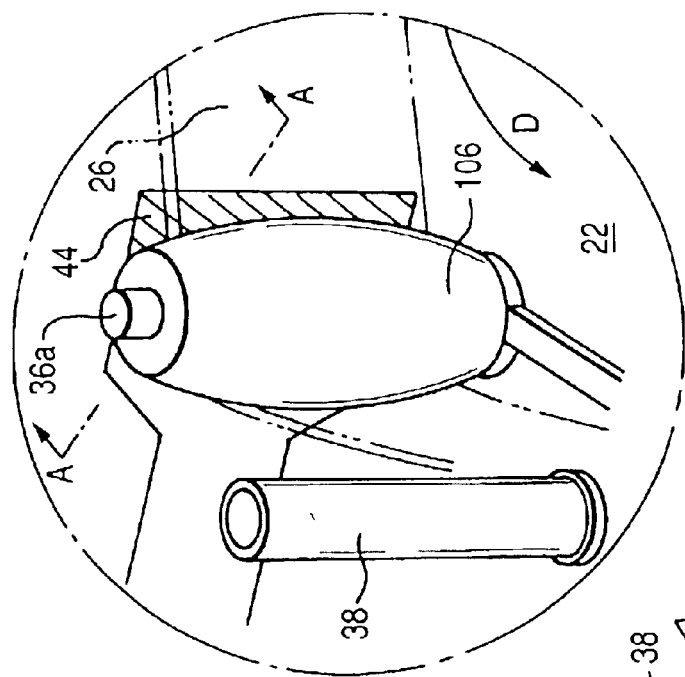
FIG. 1A and FIG. 1B are perspective views showing a principal part of the first embodiment of the present invention.

Referring now to the drawings, embodiments of the present invention will be described. The description about the components already described will be simplified or omitted by designating the same or the corresponding numbers or signs.

Figure 1A:
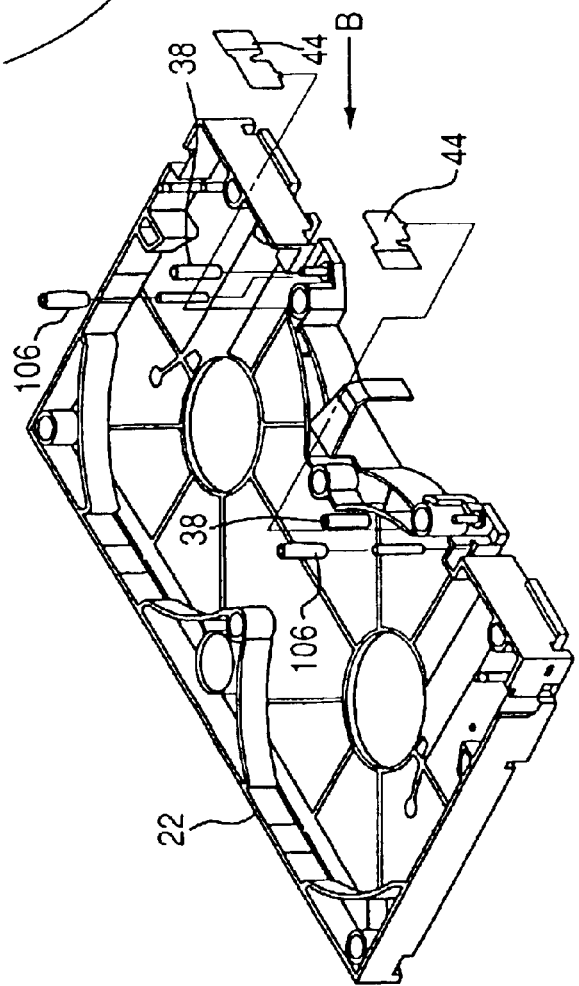

FIG. 1A shows a lower cassette half 22 of the magnetic tape cassette on which the guide roller 106 according to the first embodiment of the present invention, and an enlarged view of the lower cassette half 22 with the guide roller 106 and the guide pin 38 are mounted, viewed in the direction shown by an arrow B, is shown as FIG. 1B. As regards the tape reels or the upper cassette half not shown in the figure, the same type as the related art may be employed. As shown in FIG. 1(A), the guide roller and the guide pin 38 are mounted on both sides of the opening formed on the front end side of the lower cassette half 22 (the side facing toward the recording head of the recording/replaying apparatus), across which the magnetic tape is routed.

FIG. 1B shows a state in which the magnetic tape 26 is unwound from the tape reel, not shown, in the direction shown by the arrow D, and routed out from the cassette case via the guide roller 106. The magnetic tape 26 urged by the pad 44 travels on the outer circumferential surface of the guide roller 106 and then passes between the guide pin 38 and the guide roller 106, and routed out from the cassette case for traveling over the magnetic head of the recording/replaying apparatus, not shown.

Figure 2:
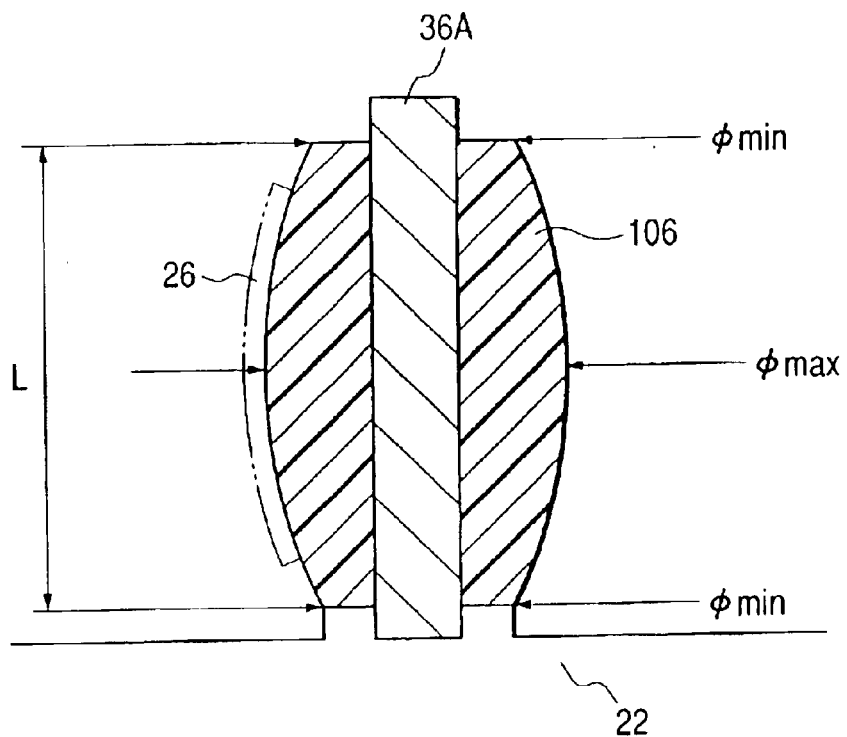
FIG. 2 is a cross sectional view taken along the line A—A in FIG. 1.

FIG. 2 is a cross sectional view taken along the line A—A in FIG. 1B. The guide roller 106 has the maximum outer circumferential diameter $\Phi_{max}$ at the axially central portion, and the minimum outer circumferential diameter $\Phi_{max}$ at axial ends thereof. The guide roller 106 is shaped like a barrel having a curved outer circumferential surface of which the outer circumferential diameter decreases gradually from the axially central portion toward the axially end portions. The guide roller 106 is symmetrical about the central portion thereof.

The guide roller 106 is formed in such a manner that the coefficient of curvature T expressed by the expression [1] that represents the extent of curvature of the outer circumferential surface is between 0.001 and 0.01 inclusive.

$$T=\Delta/(L\Phi_{max}) \quad [1]$$

Wherein $\Delta$ represents a difference between the maximum diameter and the minimum diameter of the outer circumferential surface of the guide roller (mm), L represents the axial length of the guide roller, and $\Phi_{max}$ is a maximum diameter (mm) of the circumferential surface of the guide roller (mm).

In the magnetic tape cassette of a structure described above, the circumferential velocity is faster at the axially central portion than at the axially end portions. Therefore, since the magnetic tape 26 travels stably along the axially central portion of the guide roller 106, errors in reading/writing of the record may be prevented.

The guide roller 106 has a shape symmetrical about the axially central portion on which the magnetic tape travels. Therefore, the distribution of a tensile strength from the central portion toward the edges across the magnetic tape is also symmetrical so that the magnetic tape resists displacing in the axial direction of the guide roller 106. Since the coefficient of curvature T representing the extent of curvature of the outer circumferential surface is set to not less than 0.001 and not more than 0.01, the magnetic tape can travel stably on the outer circumferential surface of the guide roller without being displaced from the normal position, and thus errors in reading and writing may be prevented from occurring when the magnetic tape travels over the magnetic head.

The significant effect of the present invention will be described according to the first embodiment.

Figure 20:
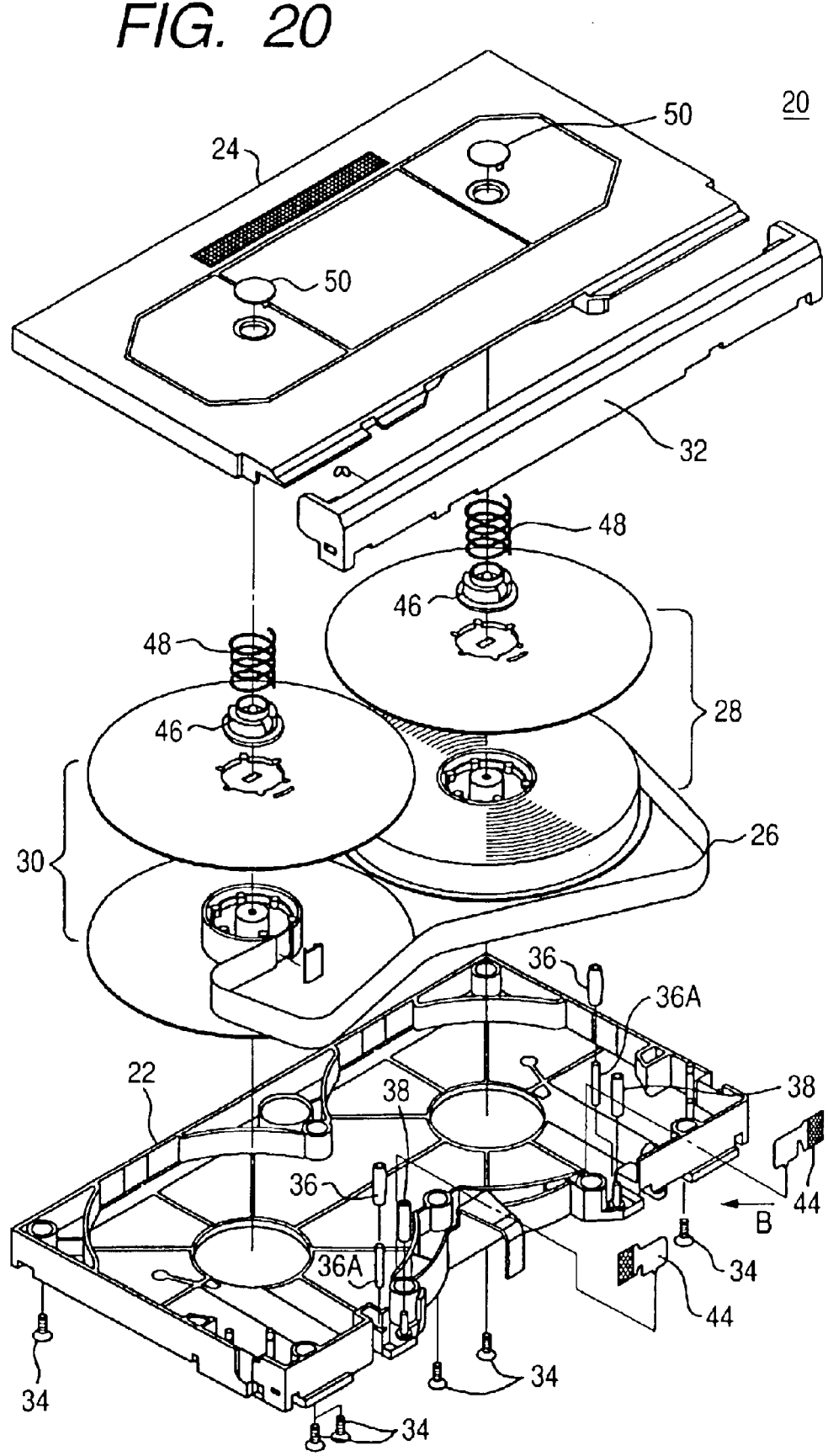
FIG. 20 is an exploded perspective view showing the main components of the BATACAM L cassette to which the guide roller of the present invention applies.
Figure 21:
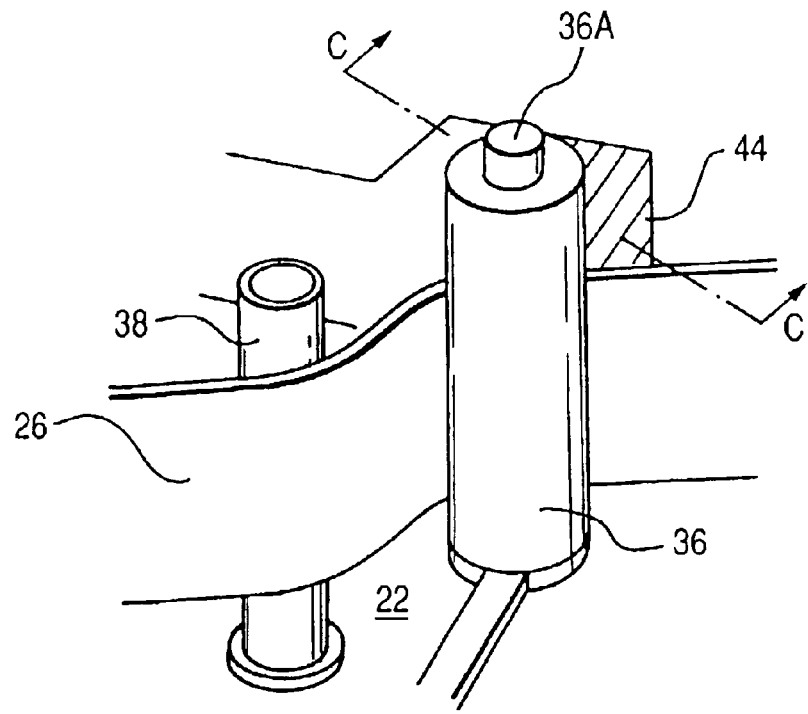
FIG. 21 is an enlarged view of FIG. 20 viewed in the direction B.
Figure 22:
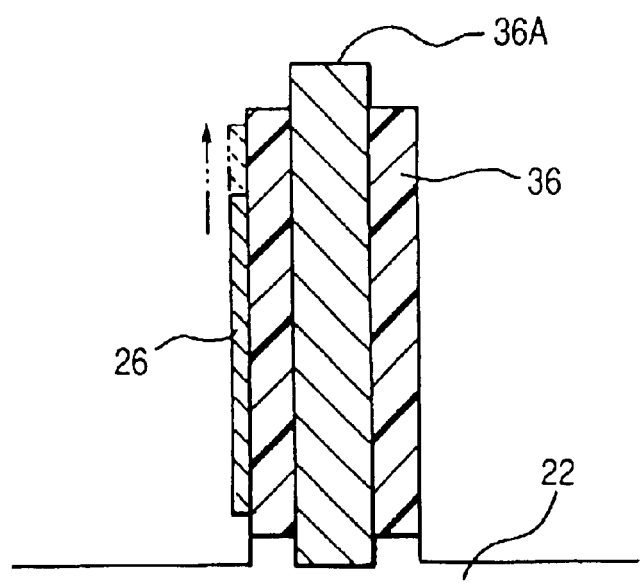
FIG. 22 is a cross sectional view taken along the line C—C in FIG. 21.

Guide rollers being barrel shape-as shown in FIG. 2 and having various coefficients of curvature T as shown in Table 1 are provided and applied to the magnetic tape cassette shown in FIG. 20, and then the magnetic tape was moved. The results of evaluation based on the observation of the magnetic tape will be shown in Table 1 as well.

These guide rollers are 17.2 mm in axial length L and 6.0 mm in maximum diameter $\Phi_{max}$ of the outer circumferential surface thereof.

TABLE 1

|  | T (1/mm) | difference $\Delta$ (mm) | evaluation |
| --- | --- | --- | --- |
| Embodiment 1 | 0.001 | 0.1 | good |
| Embodiment 2 | 0.003 | 0.3 | good |
| Embodiment 3 | 0.005 | 0.5 | very good |
| Embodiment 4 | 0.007 | 0.7 | very good |
| Embodiment 5 | 0.010 | 1.0 | good |
| Comparison 1 | 0.000 | 0 | not good |
| Comparison 2 | 0.011 | 1.1 | not good |

Figure 3:
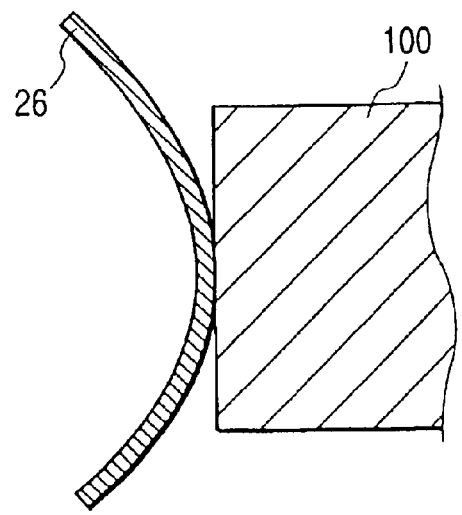
FIG. 3 is a drawing illustrating the action of a comparative example.

As shown in Table 1, especially in embodiment 3 and embodiment 4, the magnetic tape traveled very stably without being displaced in the axial direction of the guide roller, and satisfactory reading and writing could be made. In the comparative example 1, the tape was apt to be displaced, and in the comparative example 2, since the radius of curvature of the guide roller is too large, the magnetic tape was bent as shown in FIG. 3, and thus errors in reading and writing occurred.

The present invention may be changed or improved without being limited to the embodiments described above.

For example, it is also possible to rotatably mount the guide roller on the upper cassette half. Alternatively, the guide pin formed of a molded resin may be employed and mounted on the lower cassette half.

Figure 4D:
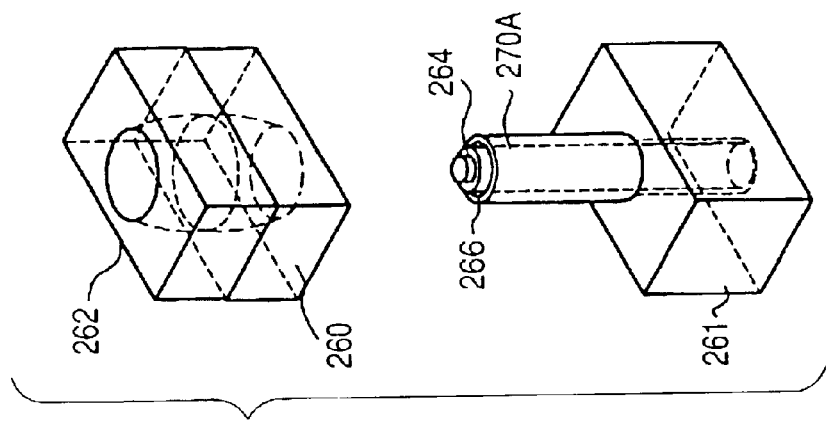
FIG. 4A to FIG. 4D are a perspective view of a mold according to the second embodiment of the present invention and a molding procedure using the same.
Figure 4C:
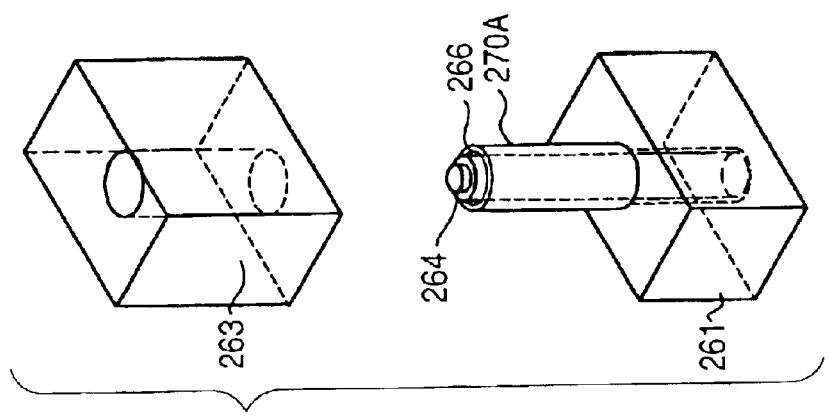
Figure 4B:
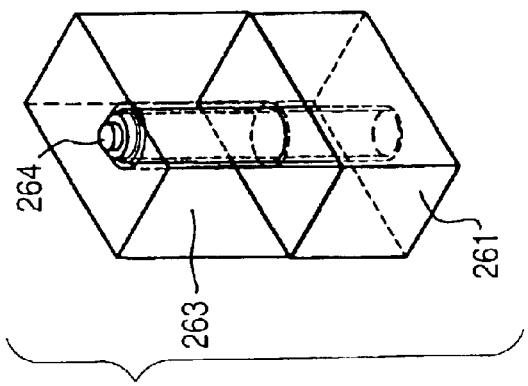
Figure 4A:
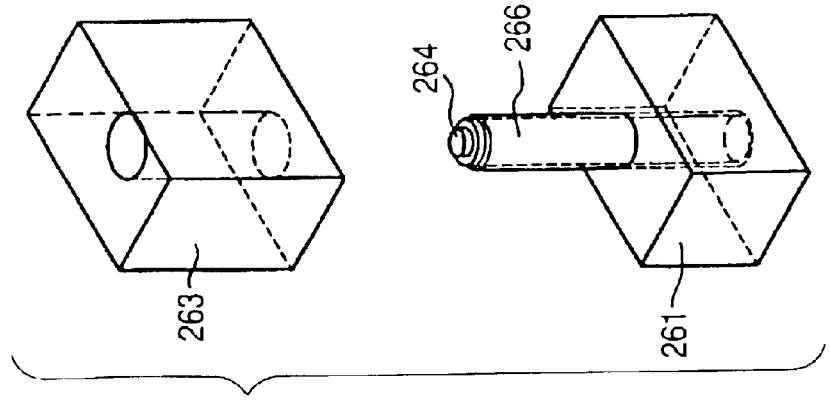
Figure 5G:
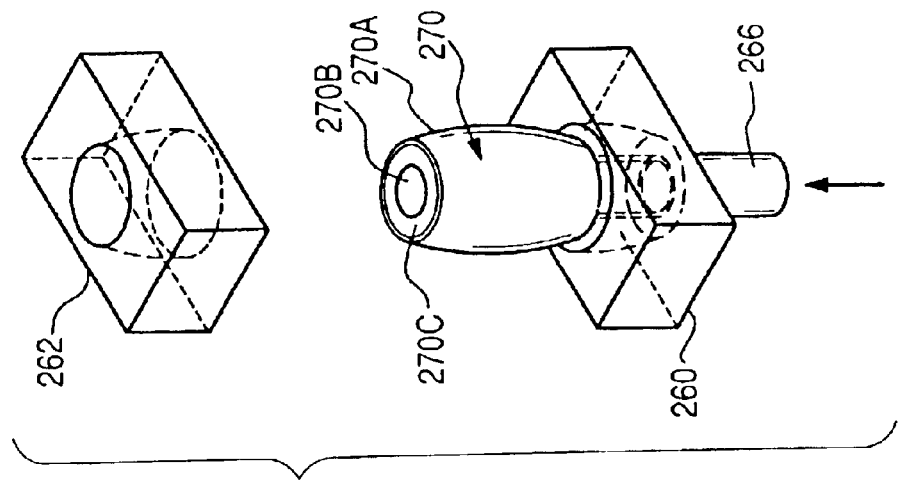
FIG. 5E to FIG. 5G are a perspective view of a mold according to the second embodiment of the present invention and a molding procedure using the same.
Figure 5F:
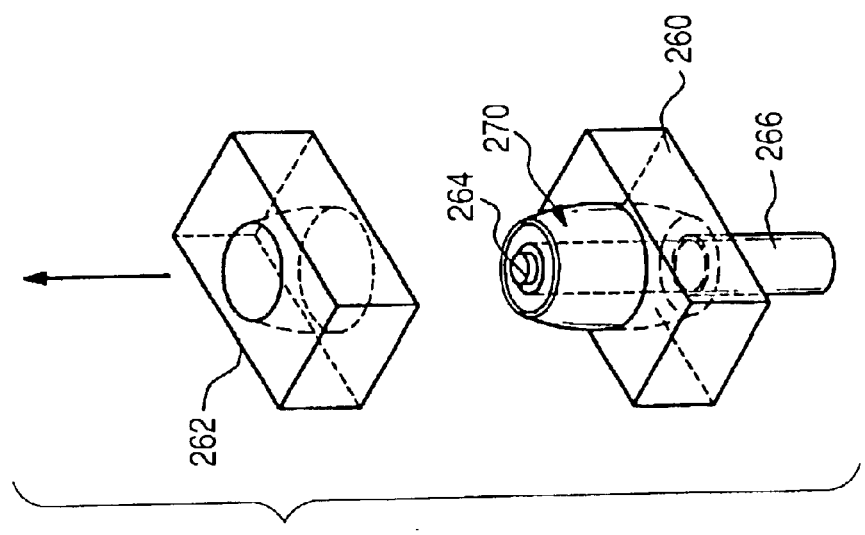
Figure 5E:
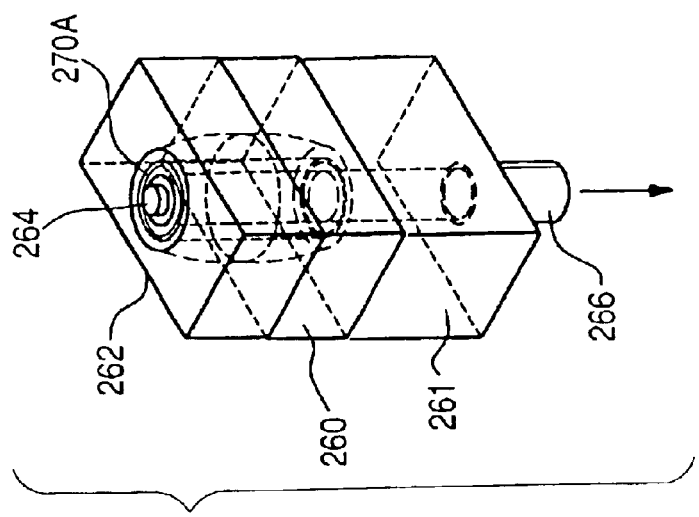
Figure 6:
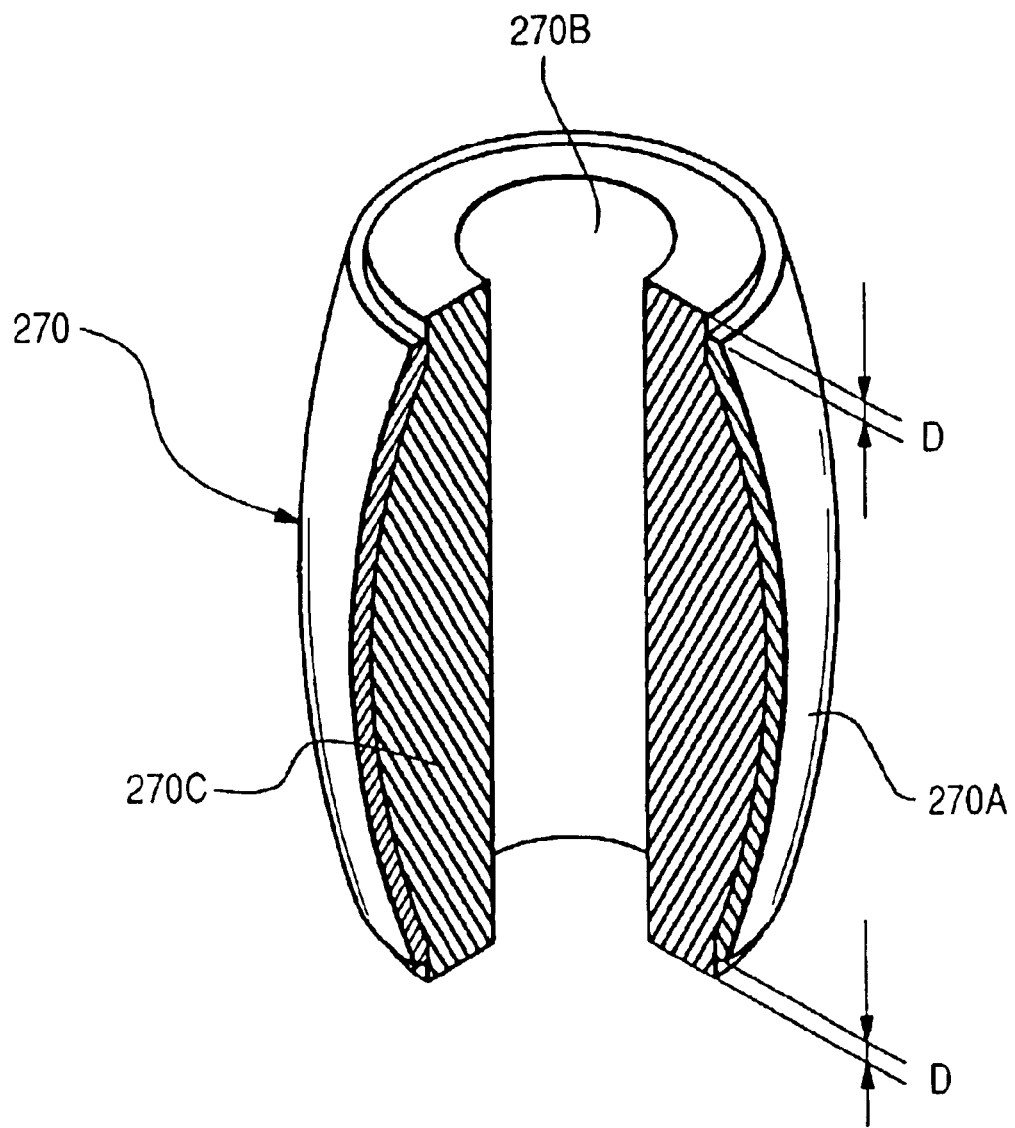
FIG. 6 is a perspective view of the completed guide roller 270 partly cross sectional.
Figure 7:
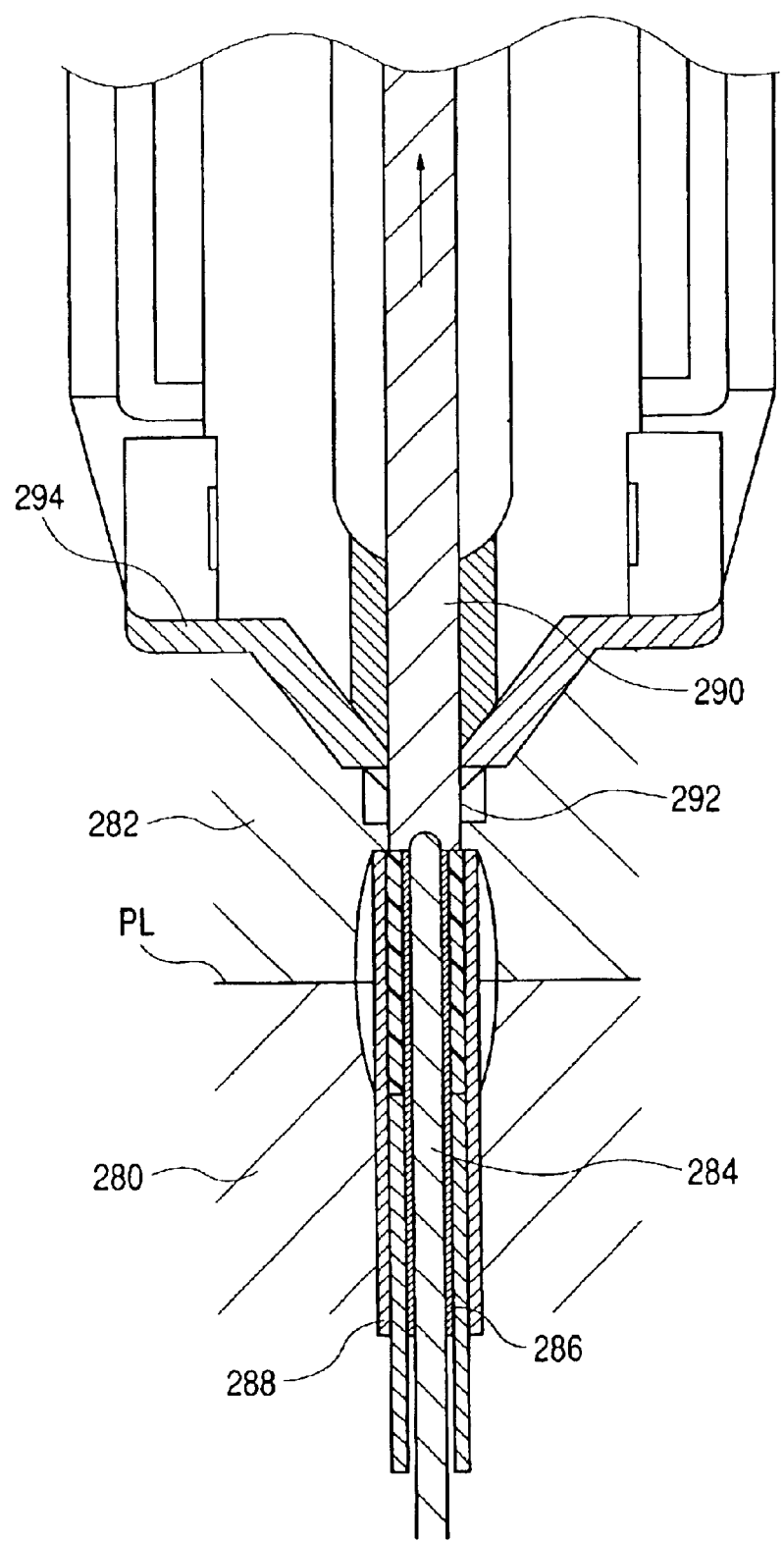
FIG. 7 is a cross sectional view of the mold showing a molding procedure according to the third embodiment of the present invention.

FIGS. 4A to 4D and FIGS. 5E to 5G are perspective views showing the molding procedure of the guide roller according to the second embodiment of the present invention, and FIG. 6 is a perspective cross sectional view of the guide roller obtained by the molding.

As shown in FIGS. 4A to 4C, the mold for injection molding comprises a first core plate 261, a cavity plate 263 detachably engaged with said first core plate 261, and as shown in FIG. 4D and FIGS. 5E to 5G, a second core plate 260 and a second cavity plate 262 detachably engaged with said second core plate 260. The first cavity plate 263 is formed with a cylindrical cavity. On the other hand, the second core plate 260 and the second cavity plate 262 are respectively formed with cavity halves each of which is shaped like a barrel cut into two pieces along the maximum diameter, and thus the parting line PL lies at the center which corresponds to the maximum diameter of the guide roller to be obtained. There is provided an insert pin 264 at the center of the first core plate 261 and a sleeve 266 slidably around the insert pin 264.

A gate is defined in the first and second cavity plate 263, 262, not shown, which are located almost on top of the sleeve 266. Therefore, a tubular primary molding 270A is molded by the steps of engaging the first cavity plate 263 with the first core plate 261 into the state shown in FIG. 4B, and filling resin such as POM between the sleeve 266 and the cavity through the gate by injection.

Then, the first cavity plate 263 is moved upward so that the primary molding 270A is left on the first core plate 261. At this stage, there are disposed an insert pin 264 on the center of the first core plate 261 and a sleeve 266 therearound. Subsequently, as shown in FIG. 4D, the first cavity plate 263 is replaced with the second core plate 260 and the second cavity plate 262. Then the sleeve 266 is withdrawn in the state shown in FIG. 5E, and resin is filled between the inner surface of the primary molding 270A and the insert pin 264 so as to be filled all around by injection through the gate. As a consequent, the primary molding bulges into the shape of the cavity by the injection pressure of resin so as to be integrated with the injected resin filled within the primary molding 270A.

As a next step, as shown in FIG. 5F, the second cavity plate 262 is detached. Subsequently, as shown in FIG. 5G, the insert pin 264 and the sleeve 266 are utilized as a knockout pin by withdrawing the insert pin 264 and moving the sleeve 266 upward, so that the guide roller 270 can be ejected from the second core plate 260 as a molding.

The obtained guide roller 270 is shaped like a barrel, and an axis hole 270B having a diameter corresponding to that of the insert pin 264 is formed longitudinally through the center thereof. Though the outer jacket 270A and the substance 270C therein are shown as separate bodies, they are integrally formed in fact.

The longitudinal dimension of the outer jacket 270A is preferably formed in such a manner that it is behind the upper and lower ends of the guide roller 270 by a small dimension D. It is for preventing projection due to molding burr from being formed on the tubular ends of the primary molding, and also for preventing the outer jacket 270A from being rolled up as in the case where the projection is projecting from the end surface and the guide roller 270 is rotated in the state of being loosely fitted on the pin and seated on the bottom of the cassette half.

In addition, the thickness of the outer jacket 270A is defined in the range between 0.1 mm and 1.0 mm inclusive. It is because in case where POM is used as a resin, though it may differ depending on the type of resin used, molding temperature, general dimensions, when thickness below 0.1 mm deteriorates flow of resin and causes short shot, and thickness over 1.0 mm resists bulging. Accordingly, the profile of the primary molding may be formed into an accurate cavity shape with resin injected within the primary molding by limiting the thickness of the outer jacket 270A within the range described above.

In FIGS. 4C, 4D and 5E, when the first cavity plate 263 for molding the primary molding is replaced with the second core plate 260 and the second cavity plate 262 for molding the main body, it is required to rotate the first core plate 261 to move toward the position of the second core plate 260 and the second cavity plate 262. However, in the third and the fourth embodiments described below, the identical mold is used and the primary molding and the main body may be molded successively.

FIGS. 7 to 10 are cross sectional views showing a molding sequence according to the third embodiment of the present invention. The mold for injection molding shown in the figure is so called of hot runner type, and comprises a core plate 280, and a cavity plate to be detachably engaged with the core plate 280. The plate 280, 282 are respectively formed with cavity halves each of which is shaped like a barrel cut into two pieces along the maximum diameter, and thus the parting line PL lies at the center which corresponds to the maximum diameter of the guide roller to be obtained. As in the second embodiment, there is provided an insert pin 284 projecting at the center of the core plate 280 and double tubular sleeves 286, 288 slidably projecting therearound.

On the other hand, a gate pin 290 is disposed at the center portion of the cavity plate 282 so as to move upward and downward. The gate pin opens the gate defined around the tip portion thereof by moving upward, and closes the same gate by moving downward. There is a heat insulating layer 294 formed around the tip of the gate pin 290.

Figure 8:
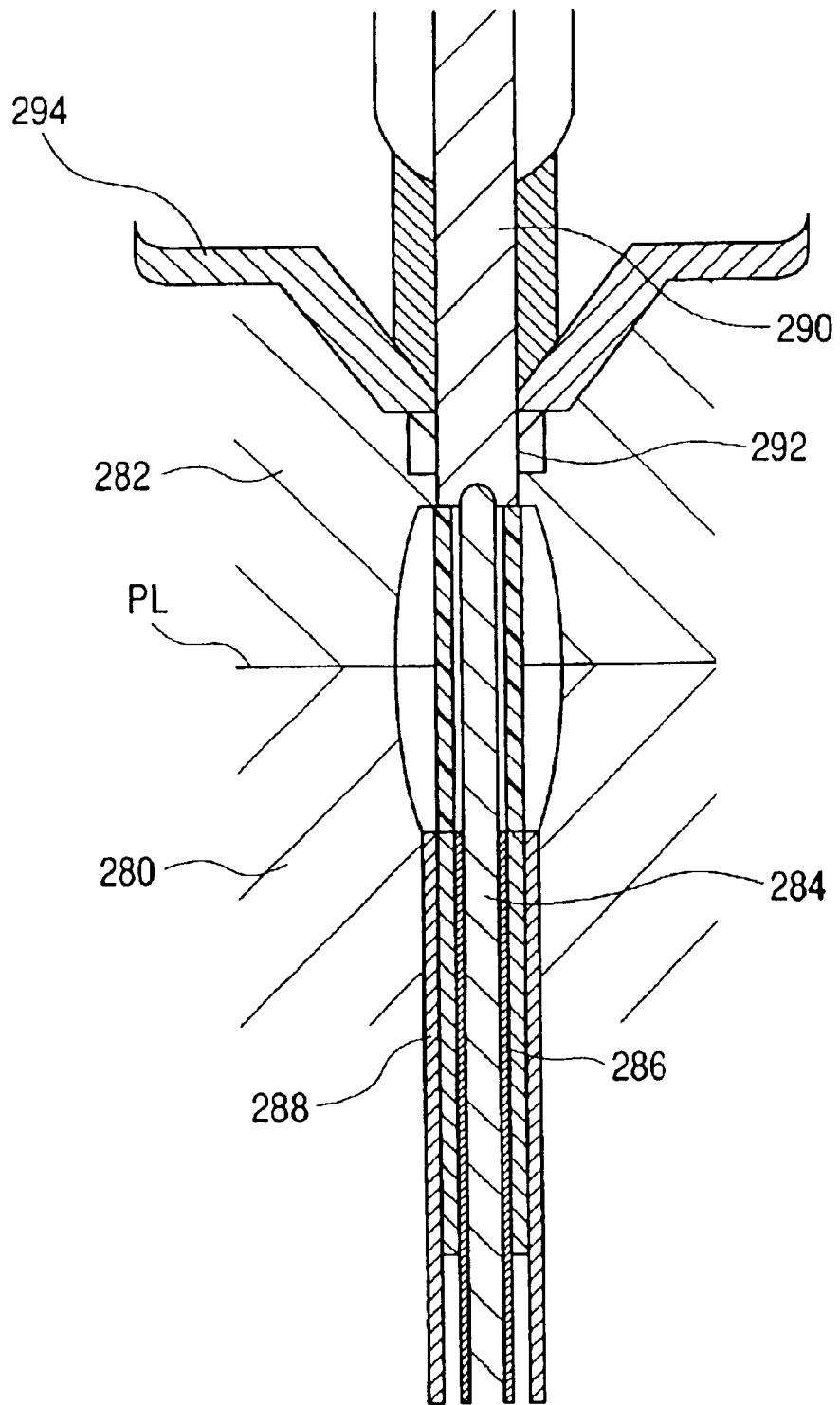
FIG. 8 is a cross sectional view of the mold showing a molding procedure according to the third embodiment of the present invention.

In the mold described above, as shown in FIG. 7, a tubular primary molding is molded by moving the sleeves 286, 288 upward, moving the gate pin 290 upward, and melting and filling resin between the sleeves 286, 288 through the gate 292. Subsequently, as shown in FIG. 8, the gate pin 290 is moved to close the gate 292 and then the sleeve 286, 288 are moved downward so that the primary molding is left in the cavity.

Figure 9:
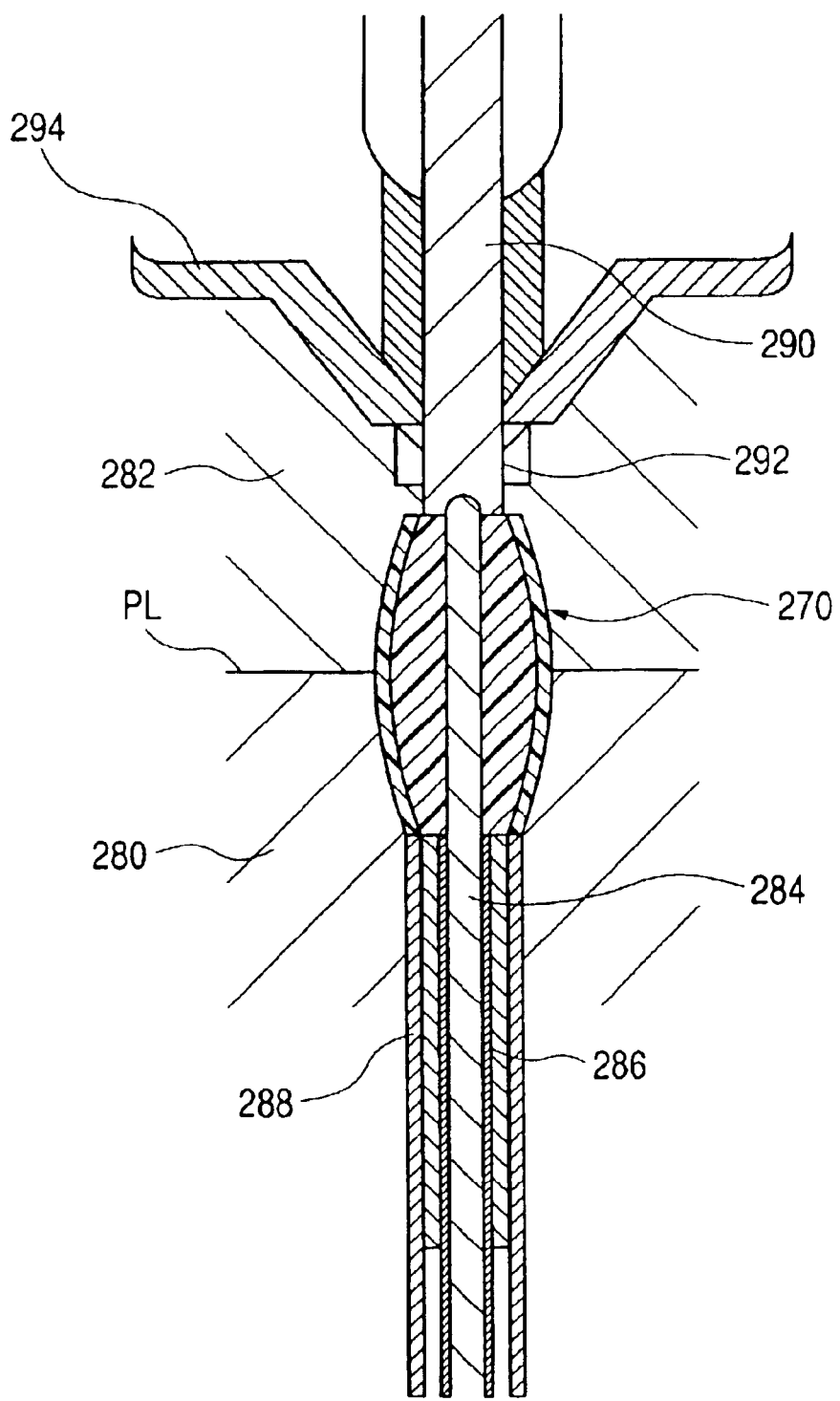
FIG. 9 is a cross sectional view of the mold showing a molding procedure according to the third embodiment of the present invention.

Subsequently, as shown in FIG. 9, injection molding is carried out for the second time with the mold kept closed, resin is injected and filled in the primary molding by opening the gate 292 so that the primary molding is bulged into the shape of a cavity and integrated with resin injected within the primary molding as in the case above, and a guide roller 270 as in the second embodiment is formed.

Figure 10:
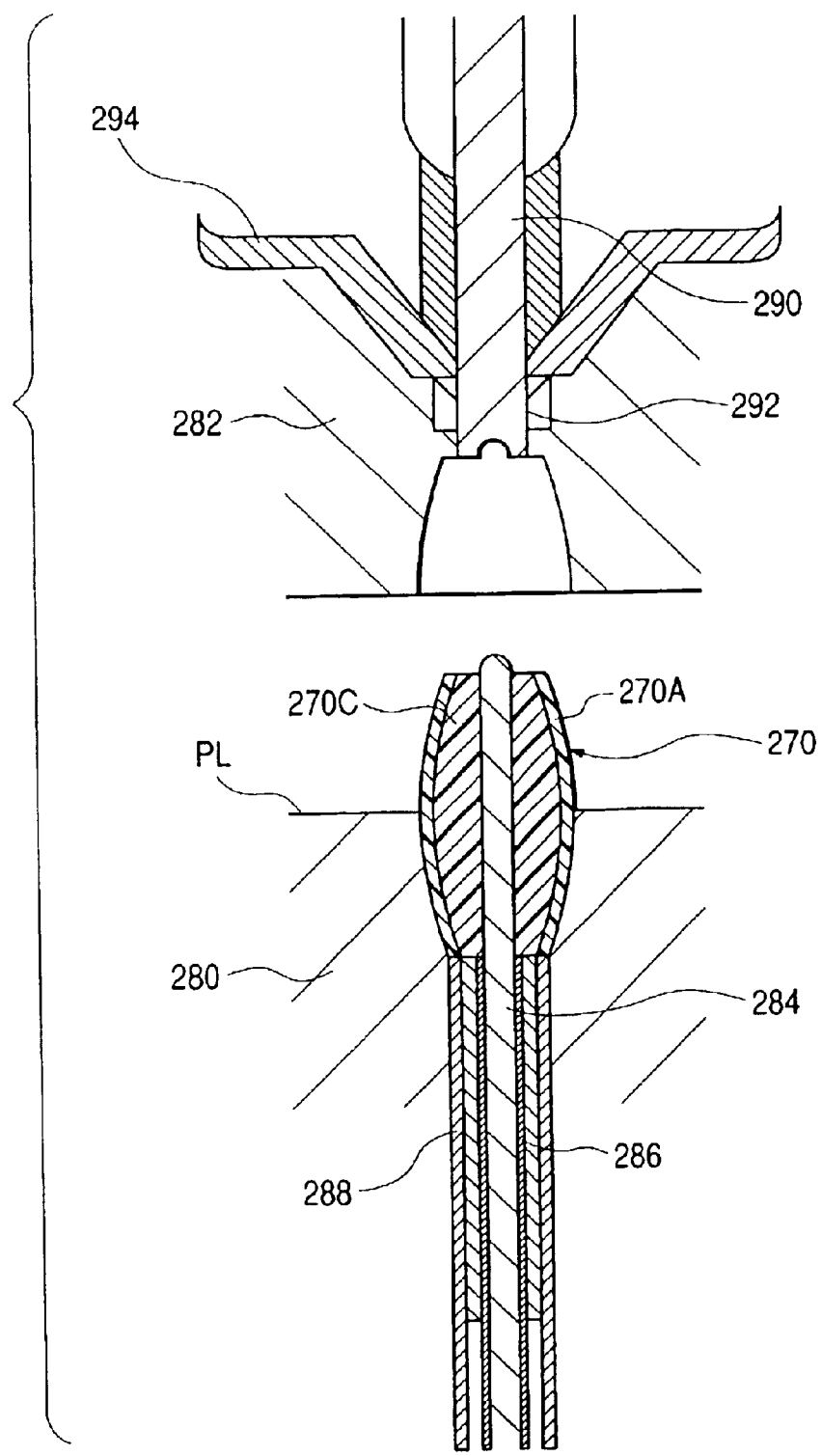
FIG. 10 is a cross sectional view of the mold showing a molding procedure according to the third embodiment of the present invention.
Figure 11:
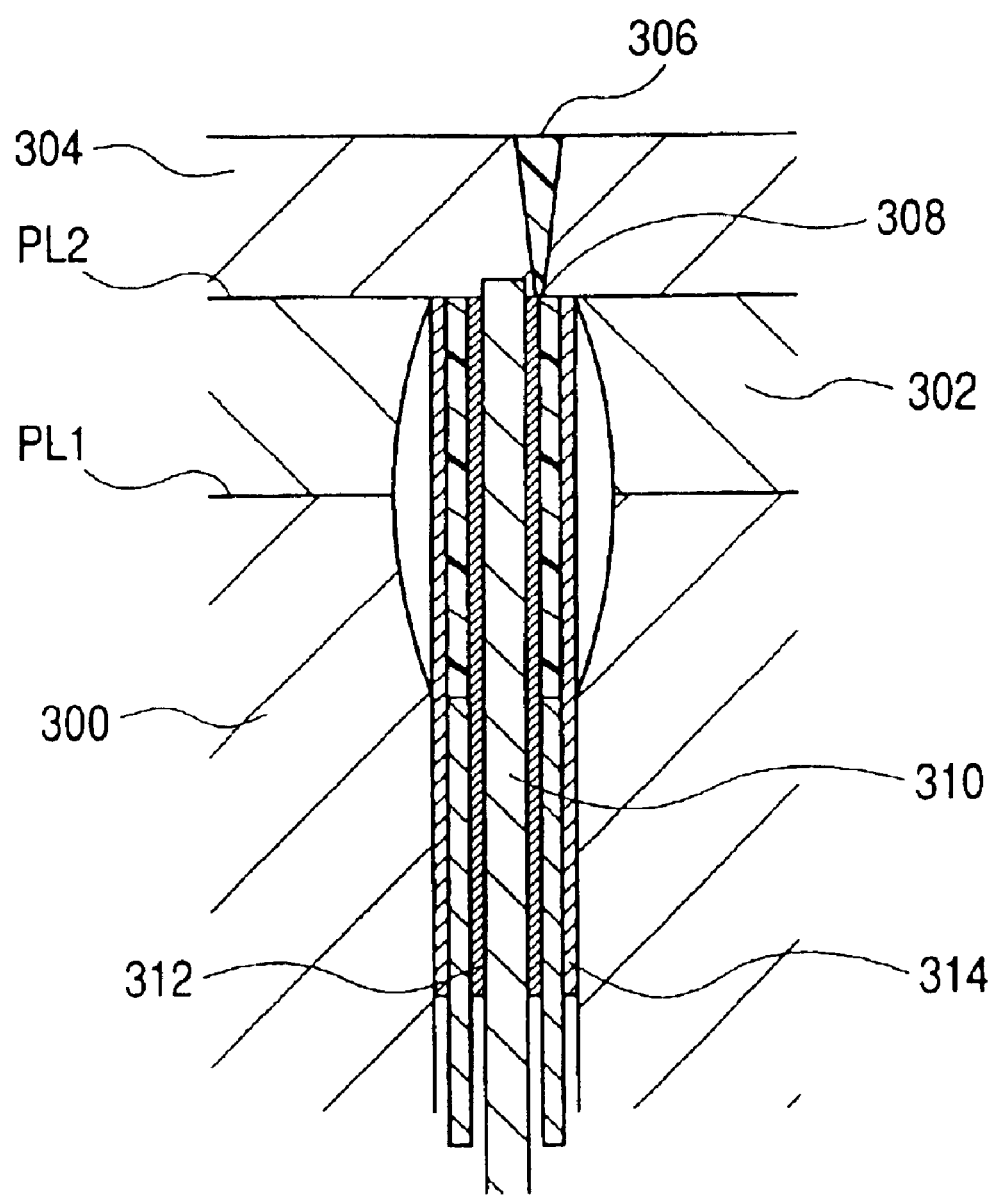
FIG. 11 is a cross sectional view of the mold showing a molding procedure according to the fourth embodiment of the present invention.

As shown in FIG. 10, the product may be taken out by moving the cavity plate 282 upward, and then, though not shown in the figure, by withdrawing the insert pin 284 and moving the sleeves 286, 288 upward.

In this embodiment, replacement of the cavity plate is not necessary, thus molding may be carried out in simple manner. The shape and dimensions of the obtained guide roller 270 are the same as the one shown in FIG. 6, a specific description is not made.

FIGS. 11 to 15 are cross sectional view showing a molding procedure according to the fourth embodiment of the present invention. The mold for injection molding shown in the figure is so called a cold runner type, and comprises a core plate 300, a cavity plate to be detachably engaged with the core plate 300, and a runner plate to be detachably engaged with the cavity plate 302. The core plate 300 and the cavity plate 302 are respectively formed with cavity halves each of which is shaped like a barrel cut into two pieces along the maximum diameter, and thus the parting line PL1 lies at the center which corresponds to the maximum diameter of the guide roller to be obtained, as in the second embodiment.

The parting line PL2 between the cavity plate 302 and the runner plate 304 lies on the end surface of the barrel shape and is in communication with the cavity of the cavity plate 302 through the runner formed in the runner plate 304 and the gate at the tip thereof.

As in the second and third embodiments, there is provided an insert pin 310 projecting at the center of the core plate 300, and an insert pin 284 projecting at the center of the core plate 280 and double tubular sleeves 312, 314 slidably projecting therearound.

Figure 12:
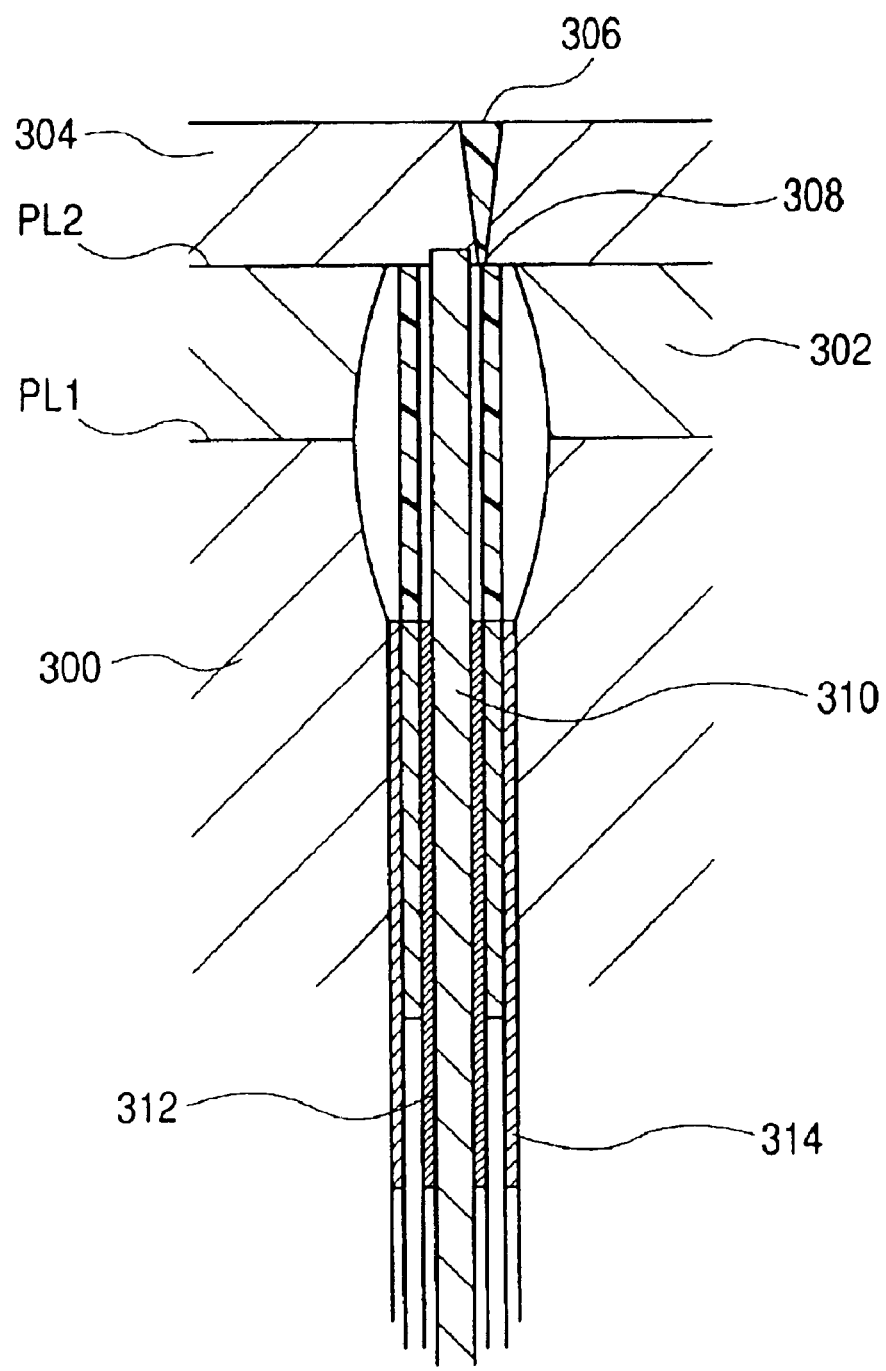
FIG. 12 is a cross sectional view of the mold showing a molding procedure according to the fourth embodiment of the present invention.

In the mold described above, as shown in FIG. 11, a tubular primary molding is molded by moving the sleeves 312, 314 upward with each plate 300, 302, 304 closed, and supplying resin through the runner 306 and the gate 308. Subsequently, as shown in FIG. 12, the sleeves 312, 314 are moved downward so that the primary molding is left in the cavity.

Figure 13:
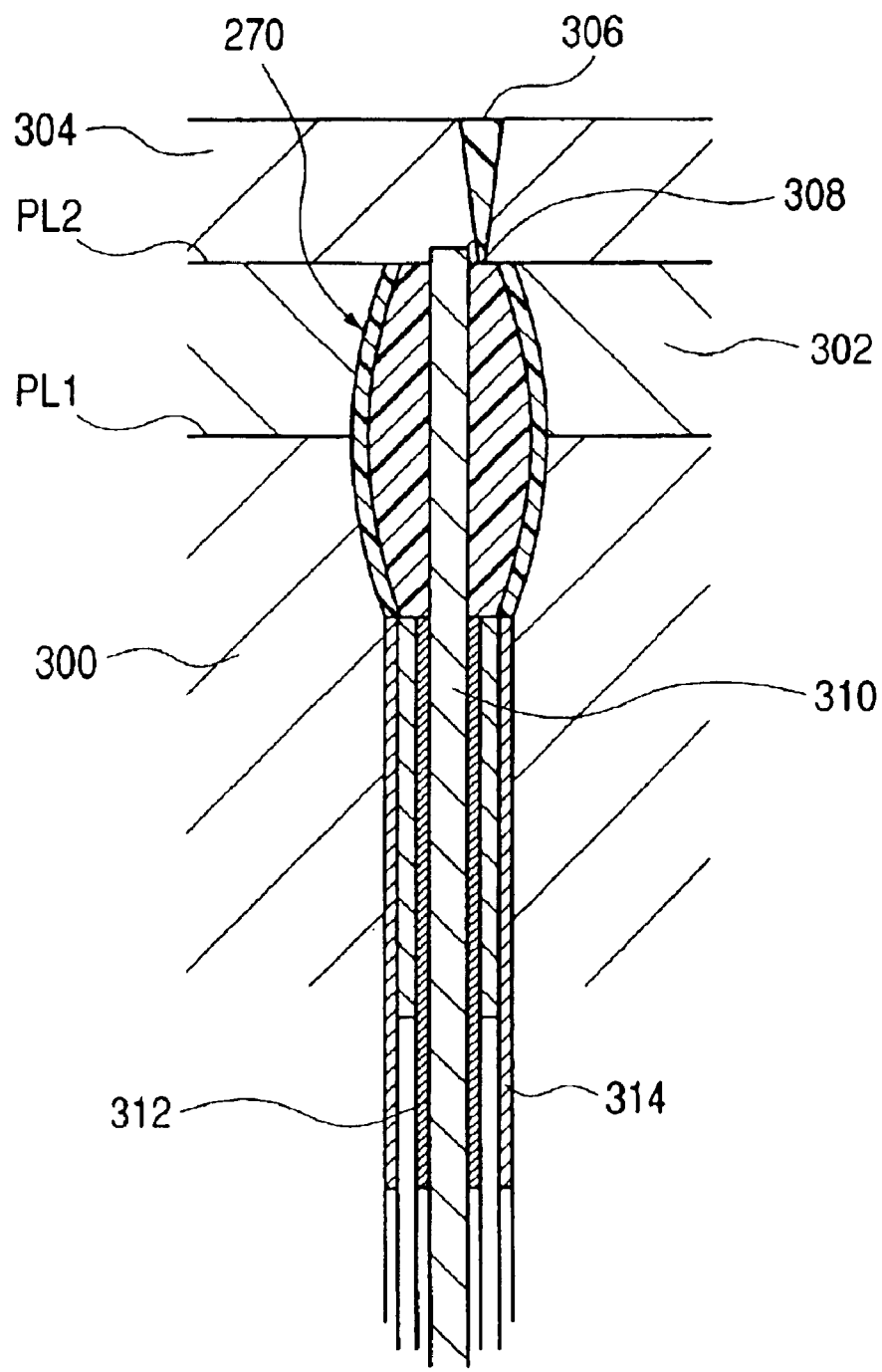
FIG. 13 is a cross sectional view of the mold showing a molding procedure according to the fourth embodiment of the present invention.

Subsequently, as shown in FIG. 13, injection molding is carried out for the second time with the mold kept closed by supplying resin through the runner 306 and the gate 308, resin is injected and filled in the primary molding so that the primary molding is bulged into the shape of cavity and integrated with resin within the primary molding as in the case above, and guide roller 270 as in the second embodiment is formed.

Figure 14:
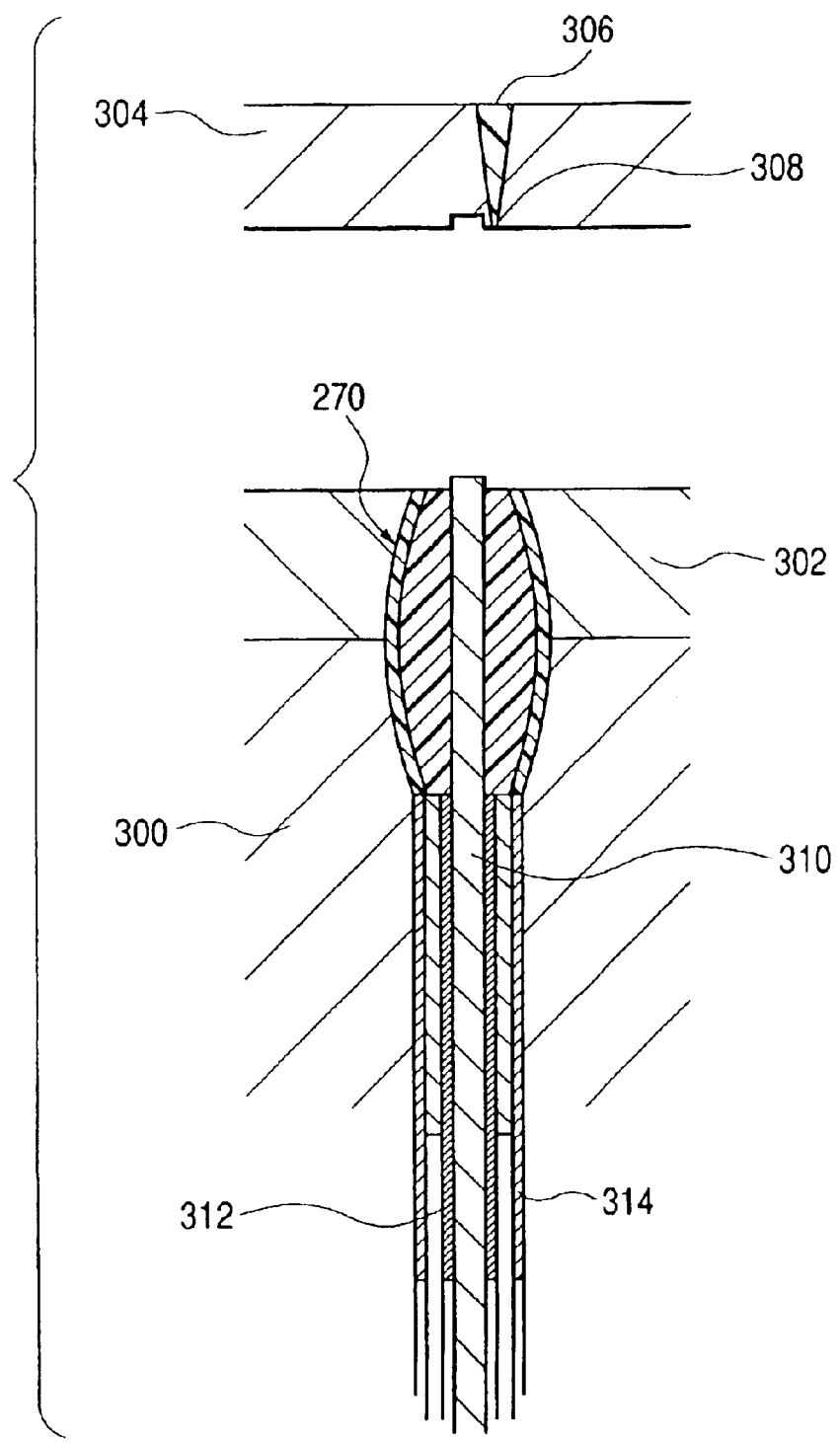
FIG. 14 is a cross sectional view of the mold showing a molding procedure according to the fourth embodiment of the present invention.
Figure 15:
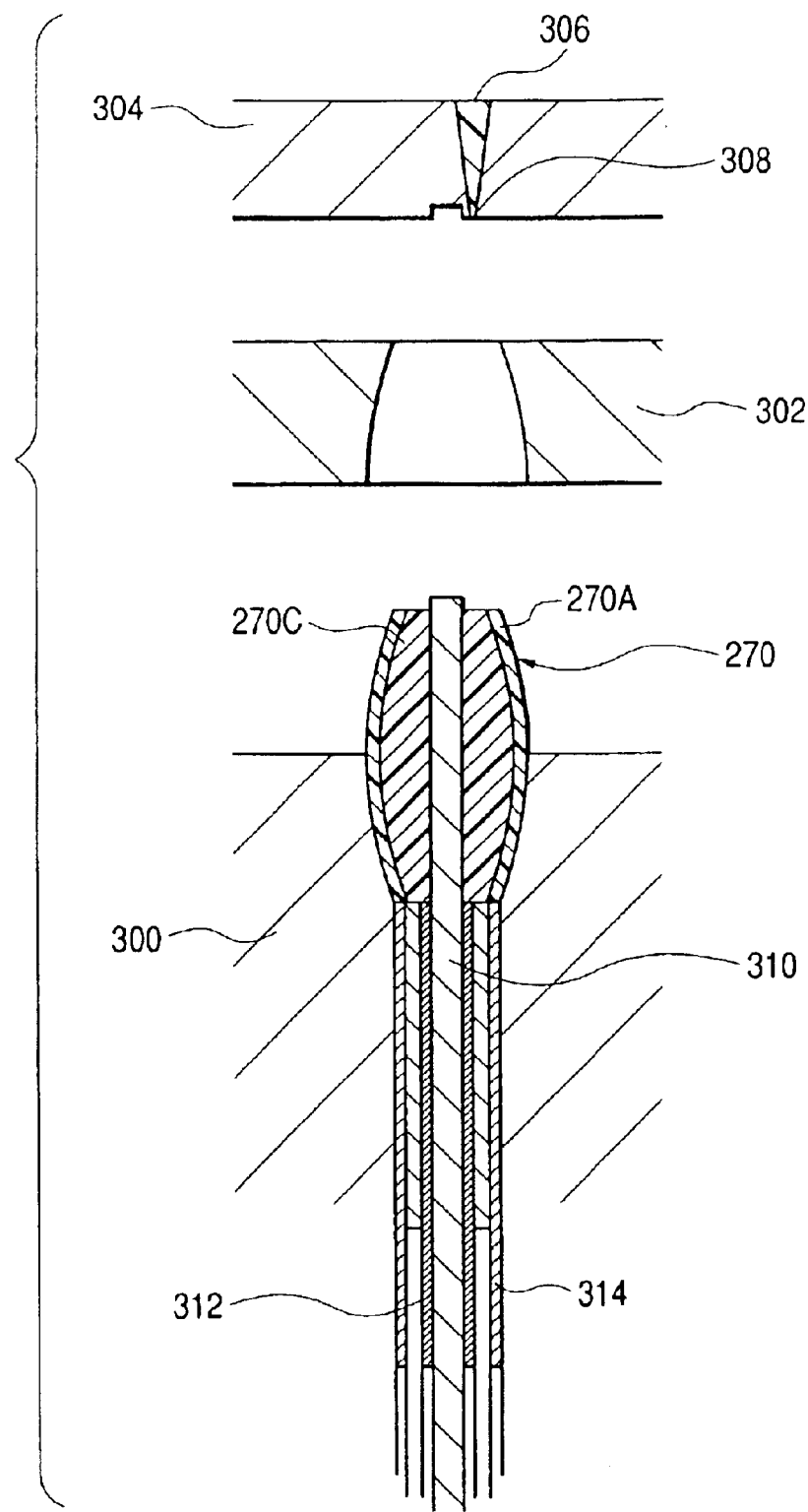
FIG. 15 is a cross sectional view of the mold showing a molding procedure according to the fourth embodiment of the present invention.

As shown in FIG. 14, the gate cut can be made by separating the runner plate 304 only. Then, as shown in FIG. 15, the cavity plate 302 is moved upward, and then, though it is not shown, the telescope pin 310 is withdrawn and the sleeves 312, 314 are moved upward to remove the product.

In this embodiment, replacement of the cavity plate is not necessary, thus molding may be carried out in a simple manner. The shape and dimensions of the obtained guide roller 270 are the same as the one shown in FIG. 6, a specific description is not made.

Figure 16:
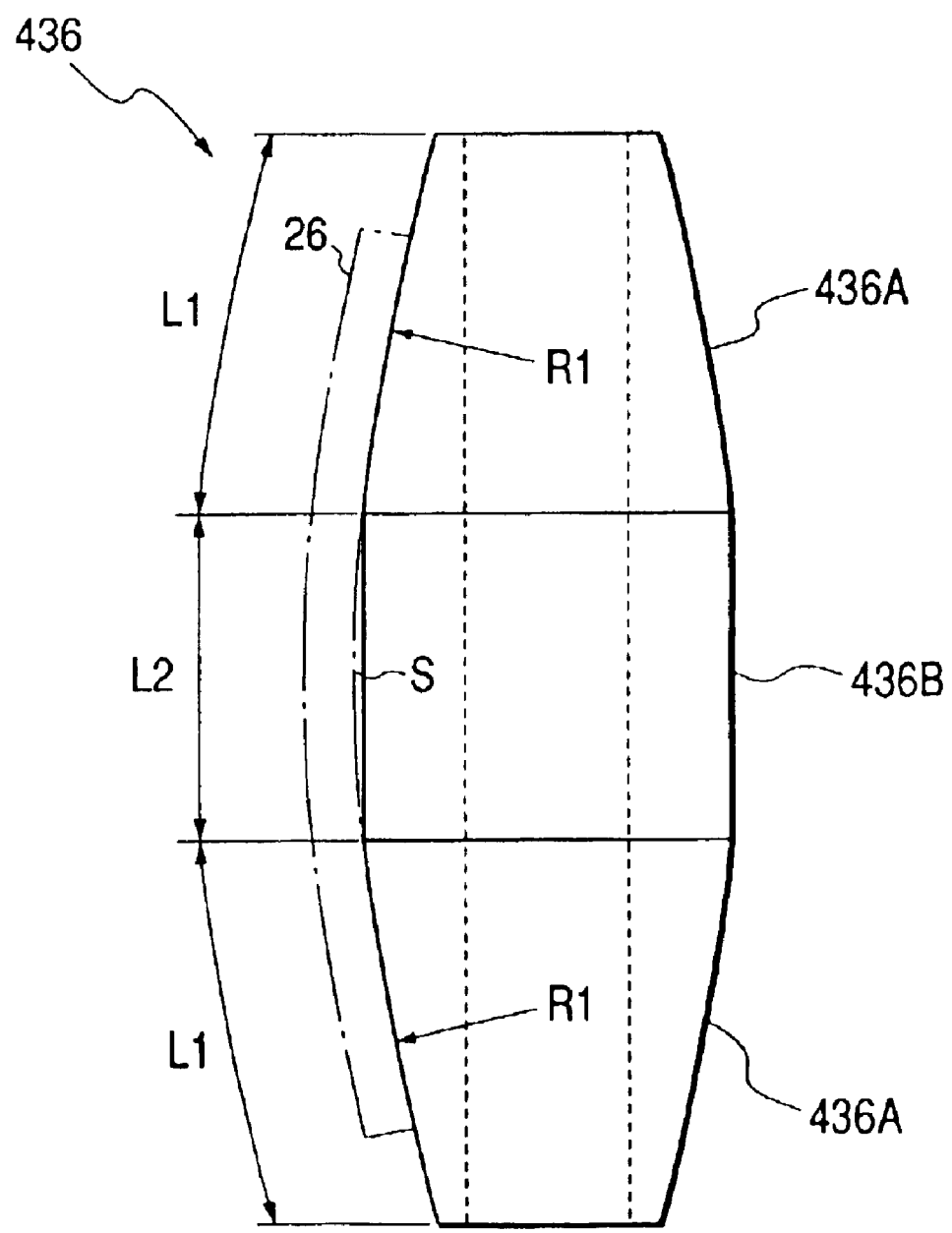
FIG. 16 is a side view of the guide roller according to the fifth embodiment of the present invention.

FIG. 16 is a side view showing the guide roller 436 according to the fifth embodiment of the present invention. The structure of the magnetic tape cassette 20 on which the guide roller 436 is mounted is the same as the related art, a specific description is not made.

The guide roller 436 is generally barrel shape and comprises a cylindrical central portion 436B of L2 in length, and the side portions 436A of L1 in length and of R1 in the radius of curvature respectively. The length L of the central portion 435B is shorter than the width of the magnetic tape 26, and thus the magnetic tape 26 routed over the guide roller extends over the whole region of the central portion 436B and parts of both end portions 436A when being guided.

Though the magnetic tape 26 is guided while being curved in almost the same cross section as the circumferential surface of the guide roller 436 while being traveled, since it is curved generally at the same radius of curvature as the side portions 436A, a small gap S is defined between the cylindrical central portion 436B and the magnetic tape 26.

The magnetic tape 26 is guided in contact with the side portions 436A of the guide roller 436 when it travels at low velocity for example for recording/replaying operation. When it travels at high velocity for example for fast-forward or fast-rewind operation, it is also guided in the same manner as in the case of the low velocity operation. However, during high velocity operation, a phenomenon in which air in the vicinity of the tape is taken between the magnetic tape 26 and the guide roller 436 in accordance with the travel of the magnetic tape 26. Since adhesion between the guide roller 436 and the magnetic tape 26 is low at the central portion 436B and high at both side portions 436A, more air taken between the central portion 436B and the magnetic tape 26.

By much air is taken between the magnetic tape 26 and the central portion 436B of the guide roller 436, the magnetic tape 26 moves away from the guide roller 436, thereby decreasing adhesion to the guide roller. Then, even when the guide roller is traveling at high velocity, the guide roller 436 slips from time to time and is not following the magnetic tape 26 all the time, whereby it does not rotate continuously.

Therefore, since the guide roller does not rotate continuously when the kinetic energy is specifically high, for example, during high velocity operation of the magnetic tape 26, cutting powder generated by sliding contact between the guide roller 436 and the upper and lower cassette halves 24, 22 may be reduced.

Figure 17:
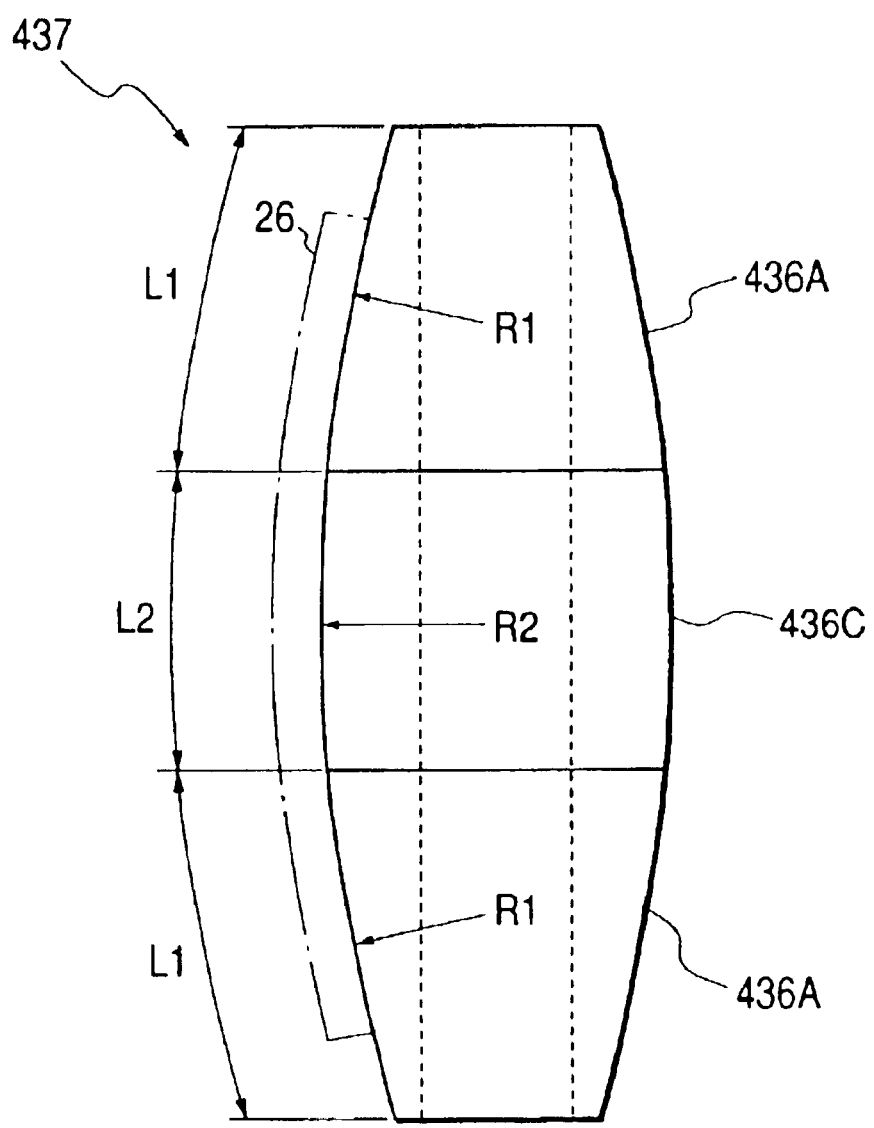
FIG. 17 is a side view of the guide roller according to the sixth embodiment of the present invention.

FIG. 17 is a side view of the guide roller 437 according to the sixth embodiment of the present invention. The sixth embodiment differs from the fifth embodiment in that the central portion 436C is not cylindrical, but the radius of curvature R2 of the central portion 436C is larger than the radius of curvature R1 of the side portions 436A.

In this structure, adhesion between the magnetic tape 26 and the guide roller 437 is higher at the side portions 436A than the central portion 436C, and the magnetic tape 26 and the central portion of the guide roller 436C are in contact with each other at low pressure. Therefore, when the magnetic tape is traveling at high velocity, an abundance of air is taken between the magnetic tape 26 and the central portion 436C of the guide roller, and as in the case described above, the guide roller 436 slips from time to time when it is traveling at high velocity and does not rotate continuously. As a consequent, generation of cutting powder due to a sliding contact between the guide roller 437 and the upper and lower cassette halves 24, 22.

Though it is essential only that the radius of curvature R2 of the central portion 436C is larger than the radius of curvature R1 of the side portions 436A even in small extent, the apex of R2 with respect to the axis of the guide roller is preferably lower than the apex on the extension of R1 with respect to said axis by at least 0.05 mm. In other words, the distance from the extended circular arc surface of the axially both side portions to the circumferential surface of the axially central portion is not less than 0.05 mm.

Figure 18:
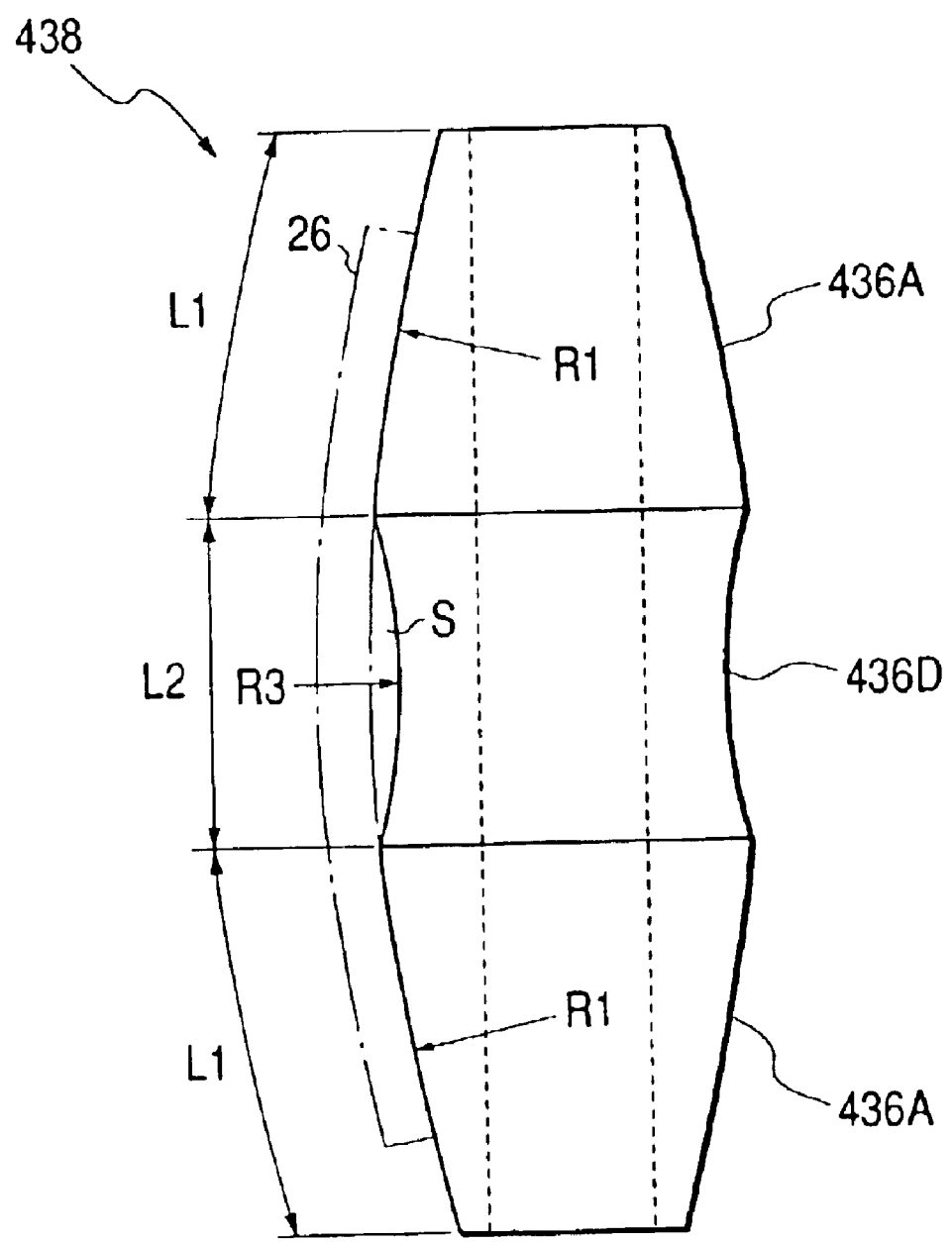
FIG. 18 is a side view of the guide roller according to the seventh embodiment of the present invention.

FIG. 18 is a side view of the guide roller 438 according to the seventh embodiment of the present invention. The seventh embodiment differs from the fifth embodiment in that the central portion 436D is not cylindrical, but shaped like inverted crown having the radius of curvature of R3. In this arrangement as well, an abundant of air is taken in the clearance between the magnetic tape 26 and the central portion of the guide roller 436D, so that the guide roller 438 slips from time to time when the magnetic tape 26 is traveling at high velocity and does not rotate continuously as described above. As a result, generation of cutting powder caused by a sliding contact between the guide roller 438 and the upper and lower cassette halves 24, 22 maybe reduced.

The maximum depth from the circular arc surface extended from the surface of the both side portions at the central portion 436D of the inverted crown shape is preferably in the range between 0.05 mm and 0.03 mm.

Figure 19:
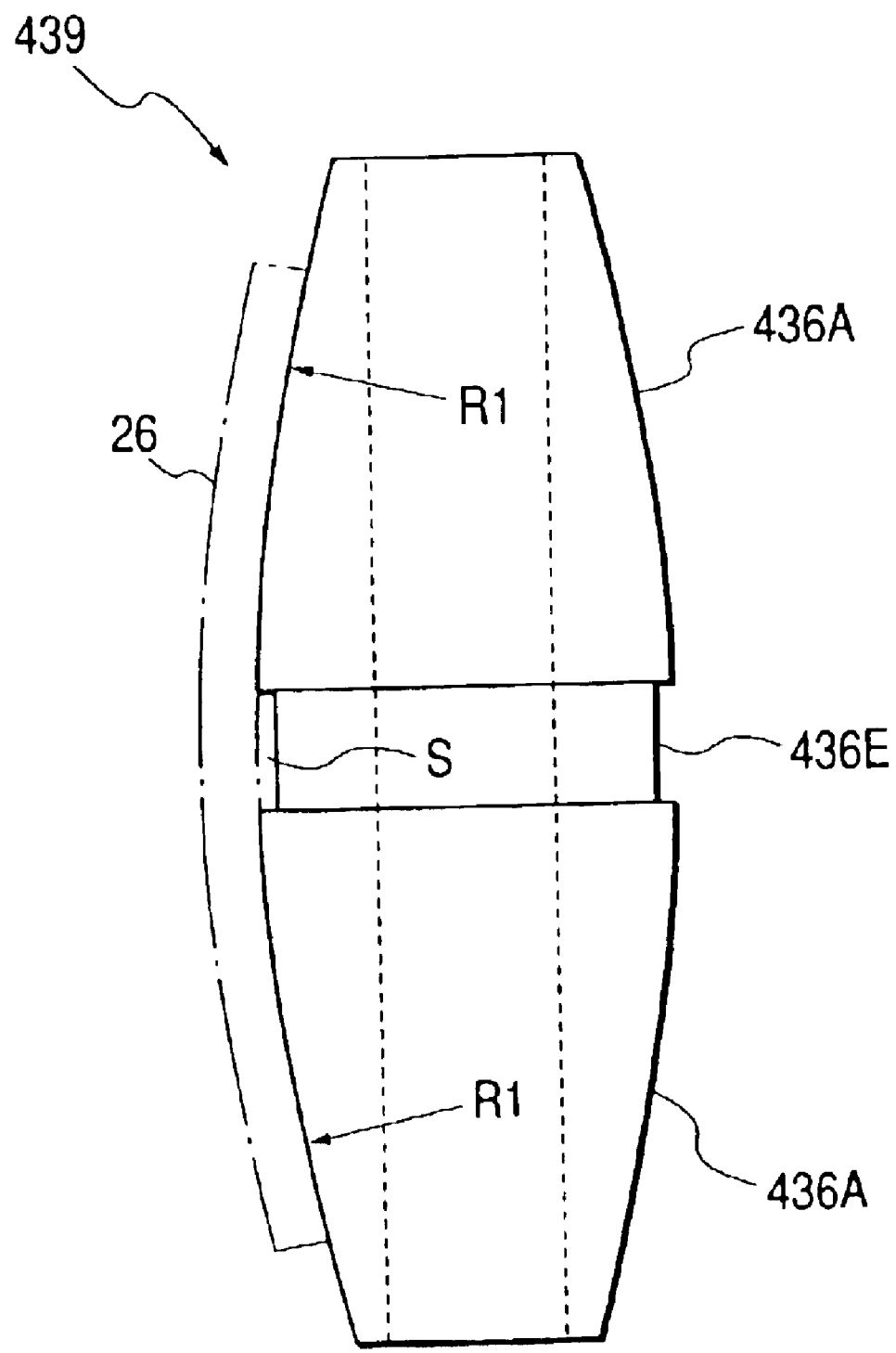
FIG. 19 is a side view of the guide roller according to the eighth embodiment of the present invention.

FIG. 19 is a side view of the guide roller 439 according to the eighth embodiment of the present invention. The eighth embodiment differs from the fifth embodiment in the structure having a groove 236E at the central portion. The radius of curvature R1 of the circumferential surface except for the grove 436E is the same. Providing a groove 436E in the center of the guide roller 439 lowers adhesion between the central portion and the magnetic tape 26, so that the guide roller 439 slips from time to time and does not rotate continuously when the magnetic tape 26 travels at high velocity. Consequently, generation of cutting powder due to a sliding contact between the guide roller 439 and the upper and lower cassette halves 24, 22 may be reduced.

Preferably, the width of the groove 436E is in the range between 0.05 mm and 1.5 mm, and the depth is in the range of 0.05 mm and 0.3 mm.

Though the groove 436E is formed all around the circumferential surface in the central region of the guide roller 439, it is also possible to provide the groove 436E along a part of the circumference at adequate intervals.

The groove 436E of this type may be added to the guide roller of the fifth to the seventh embodiments.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

(Effects)

Though the present invention has been described based on several embodiments so far, the invention includes a construction in which the structures of at least two embodiments are combined, as a matter of course.

The present invention may be modified or improved without being limited by the embodiments described above. For example, the guide roller of the present invention may be applied to various kinds of magnetic tape cassette as far as it has a guide roller these.

As described thus far, according to the guide roller for the magnetic tape cassette of the present invention, the magnetic tape travels stably on the outer circumferential surface of the guide roller without being displaced from the normal position. Therefore, errors in reading or writing of the record do not occur.

According to the guide roller for the magnetic tape cassette and the method for manufacturing the same, there is no possibility to generate molding burr even when the parting line is defined along the circumferential surface, and thus process after molding by injection molding is not necessary, thereby reducing the cost and thus achieving the economies of mass production.

According to the present invention, since an abundant of air is taken between the central portion of the guide roller and the magnetic tape when the magnetic tape is traveling at high velocity, adhesion between the magnetic tape and the guide roller is lowered so that the guide roller slips from time to time and does not rotate continuously when the magnetic tape is traveling at high velocity. Therefore, generation of cutting powder due to a sliding contact between the guide roller and the upper and lower cassette halves.

What is claimed is:

1. A method of manufacturing a guide roller for the magnetic tape cassette comprising steps of:

injecting a first resin between a sleeve slidably attached to an insert pin and a cylindrical cavity of a first cavity plate so as to mold a tubular primary molding;

leaving said tubular primary molding by withdrawing said first cavity plate;

moving a mold onto the outer periphery of said primary molding, said mold comprising a core plate and a cavity plate which define a barrel shaped cavity having its maximum diameter at its parting line when said core and cavity plates are closed, said core plate having a half of said barrel shaped cavity, and said cavity plate having the remaining half of said barrel shaped cavity, disposing a gate within said primary molding; and withdrawing said sleeve;

injecting a second resin between the inner side of said primary molding and said insert pin through said gate; and bulging said primary molding into the shape of said barrel shaped cavity by an injecting pressure to integrate said primary molding with said second resin injected within said primary molding.

2. A method of manufacturing guide roller of a magnetic tape cassette comprising steps of:

injecting a first resin between a sleeve slidably attached to an insert pin and a cylindrical cavity of a first cavity plate so as to mold a tubular primary molding;

molding a tubular primary molding by (i) arranging slidable double sleeves within a barrel shaped cavity of a mold which comprises a core plate and a cavity plate which define said barrel shaped cavity having its maximum diameter at its parting line when said core and cavity plates are closed, said core plate having a half of said barrel shaped cavity, and said cavity plate having the remaining half of said barrel shaped cavity, (ii) providing a pin for opening/closing a gate facing toward said barrel shaped cavity half of said cavity plate, (iii) then opening said gate by an action of said pin under a condition that said double sleeves are projected into said barrel shaped cavity, and (iv) injecting a first resin between said double sleeves to form said tubular primary molding;

leaving said primary molding body within said barrel shaped cavity by closing said gate and withdrawing said double sleeves; and opening said gate again and injecting a second resin within said primary molding through said gate; and bulging said primary molding into the shape of said barrel shaped cavity by an injection pressure to integrate said primary molding with said second resin injected within said primary molding.

3. A method of manufacturing a guide roller of the magnetic tape cassette wherein a mold comprises a core plate and a cavity plate defining a barrel shaped cavity, and a runner plate being able to be detached from said cavity plate and having a gate at the tip thereof, said method comprising steps of:

molding a tubular primary molding by injecting a first resin between slidable double sleeves through a gate of the runner plate under a condition that said slidable double sleeves are projected within said barrel shaped cavity when closing said mold;

leaving said primary molding within said cavity;

injecting a second resin again within the primary molding through said gate of said runner plate; and bulging said primary molding into the shape of said barrel shaped cavity by an injection pressure to integrate said primary molding with resin injected within said primary molding; and cutting the gate by detaching said runner plate.

4. The method as set forth in claim 3, wherein said barrel shaped cavity has a parting line and a maximum diameter at the parting line when said core and cavity plates are closed.

* * * * *